(12) United States Patent
Lutz

(10) Patent No.: US 7,849,763 B2
(45) Date of Patent: Dec. 14, 2010

(54) SECUREMENT DEVICE WITH AN AT LEAST HEIGHT-ADJUSTABLE STEERING COLUMN

(75) Inventor: Christian Lutz, Nüziders (AT)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 1096 days.

(21) Appl. No.: 11/578,288

(22) PCT Filed: Mar. 11, 2005

(86) PCT No.: PCT/AT2005/000087

§ 371 (c)(1),
(2), (4) Date: Oct. 13, 2006

(87) PCT Pub. No.: WO2005/100129

PCT Pub. Date: Oct. 27, 2005

(65) Prior Publication Data

US 2007/0204714 A1    Sep. 6, 2007

(30) Foreign Application Priority Data

Apr. 15, 2004    (DE) .................. 10 2004 018 902

(51) Int. Cl.
*B62D 1/18* (2006.01)
(52) U.S. Cl. .......................... 74/493; 74/492
(58) Field of Classification Search .................. 74/492, 74/493; 280/775
See application file for complete search history.

(56) References Cited

U.S. PATENT DOCUMENTS

| | | | |
|---|---|---|---|
| 4,607,540 A | | 8/1986 | Kinoshita et al. |
| 5,029,489 A | | 7/1991 | Burmeister et al. |
| 5,461,937 A | | 10/1995 | Cymbal |
| 5,566,585 A | * | 10/1996 | Snell et al. .................. 74/493 |
| 5,787,759 A | | 8/1998 | Olgren |
| 7,325,467 B2 | * | 2/2008 | Breuss et al. .................. 74/493 |

FOREIGN PATENT DOCUMENTS

| | | |
|---|---|---|
| DE | 39 14 608 | 10/1990 |
| DE | 38 11 215 | 4/1992 |
| DE | 198 39 496 | 3/2000 |

(Continued)

*Primary Examiner*—Richard W Ridley
*Assistant Examiner*—Terence Boes
(74) *Attorney, Agent, or Firm*—Wenderoth, Lind & Ponack, L.L.P.

(57) ABSTRACT

The invention relates to a device for fixing an at least height-adjustable steering column. The device includes a clamping device provided with a clamping element having an open position in which the height adjustment is released. When the clamping element passes from the opening position thereof to the closed position thereof, toothings engage with each other. A blocking element has a blocking position in which it blocks the lifting of the counter-fixing part from the fixing part, maintaining the engagement of the toothings, and a release position in which the counter-fixing part can be lifted from the fixing part. A coupling is provided between the clamping element and the blocking element During the displacement of the clamping element from the closed position to the open position, the blocking element assumes the release position only if the clamping element has already authorised the lifting of the counter-fixing part from the fixing part by the force of at least one spring in so far as the toothings thereof are no longer engaged.

29 Claims, 18 Drawing Sheets

FOREIGN PATENT DOCUMENTS

| | | |
|---|---|---|
| DE | 198 46 292 | 6/2001 |
| DE | 102 17 534 | 11/2003 |
| DE | 103 33 228 | 2/2005 |
| EP | 0 125 333 | 12/1986 |
| EP | 0 139 295 | 3/1992 |
| EP | 0 440 403 | 12/1993 |
| EP | 0 755 842 | 1/1997 |
| EP | 0 796 780 | 9/1997 |
| EP | 0 836 981 | 12/1999 |
| EP | 1 500 570 | 1/2005 |
| JP | 61-110667 | 5/1986 |

* cited by examiner

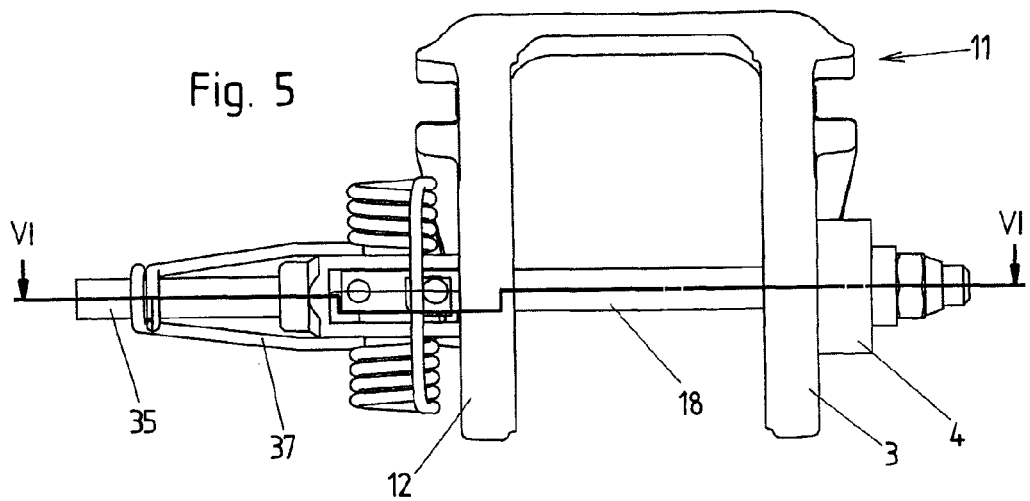
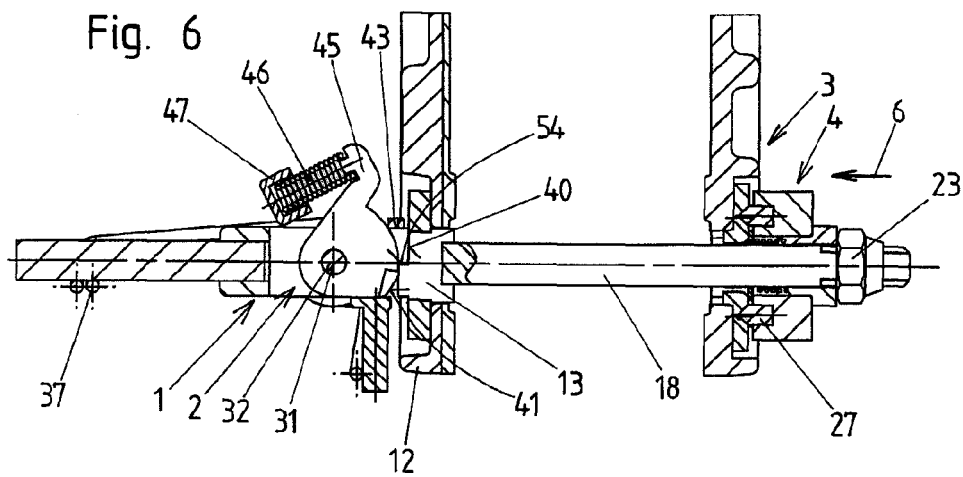
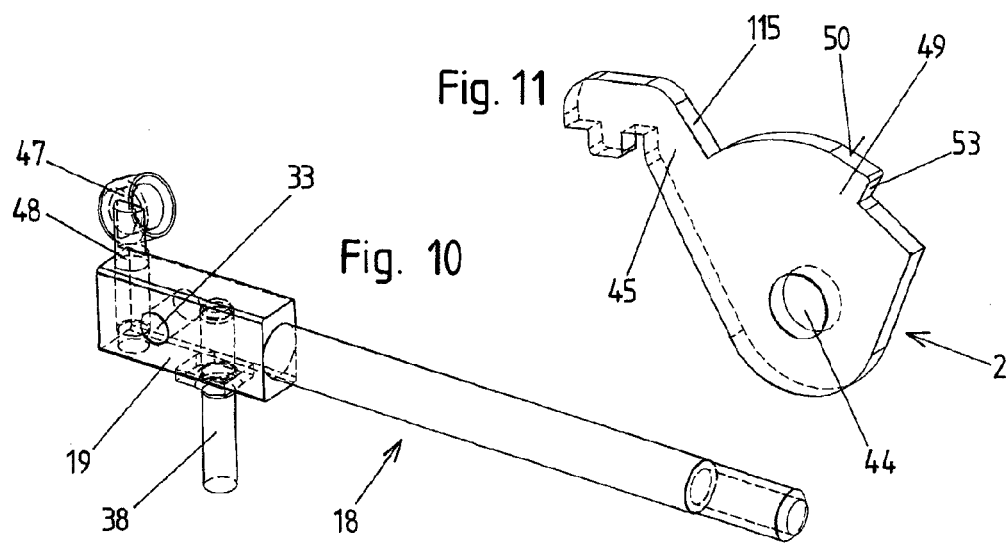

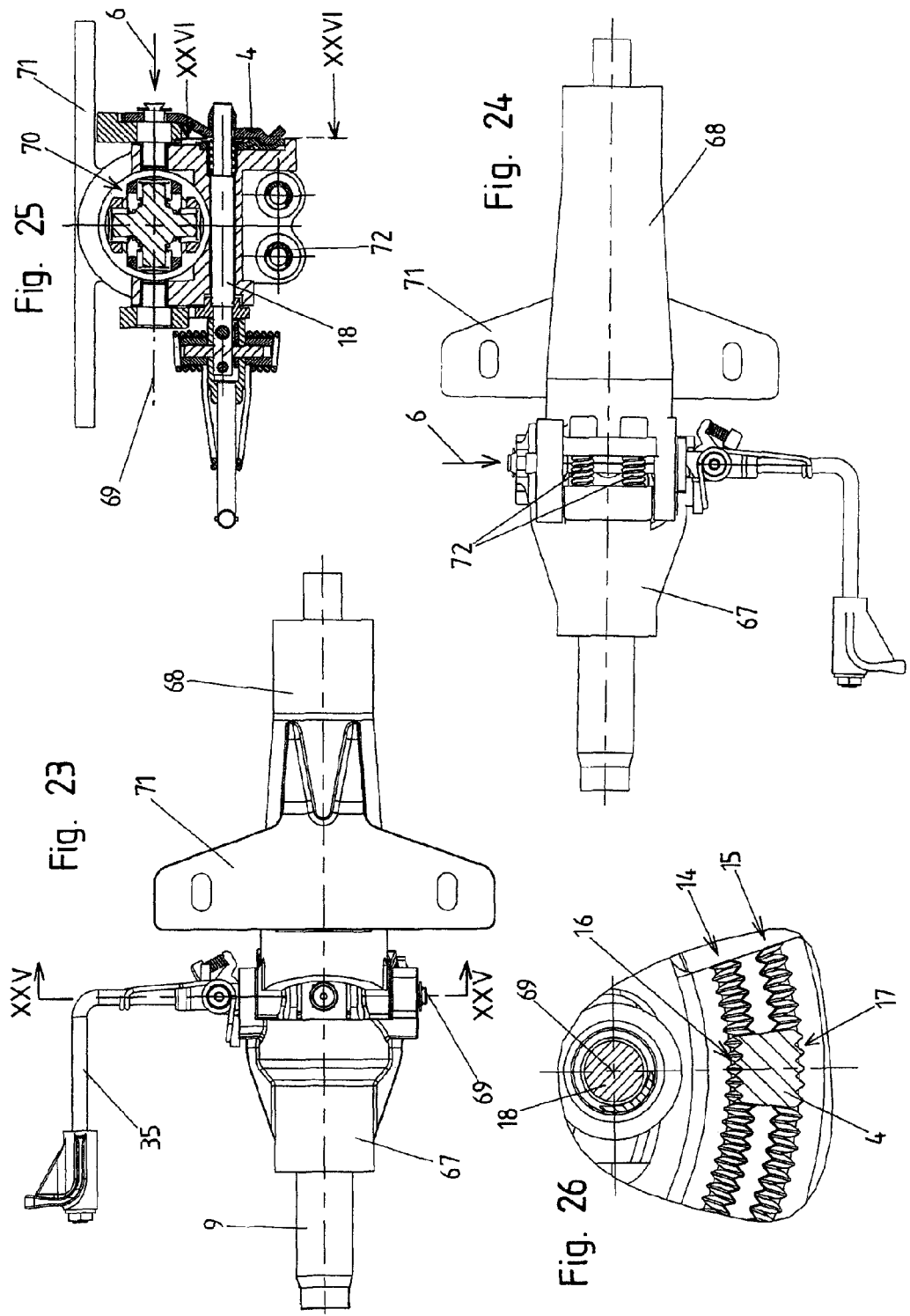

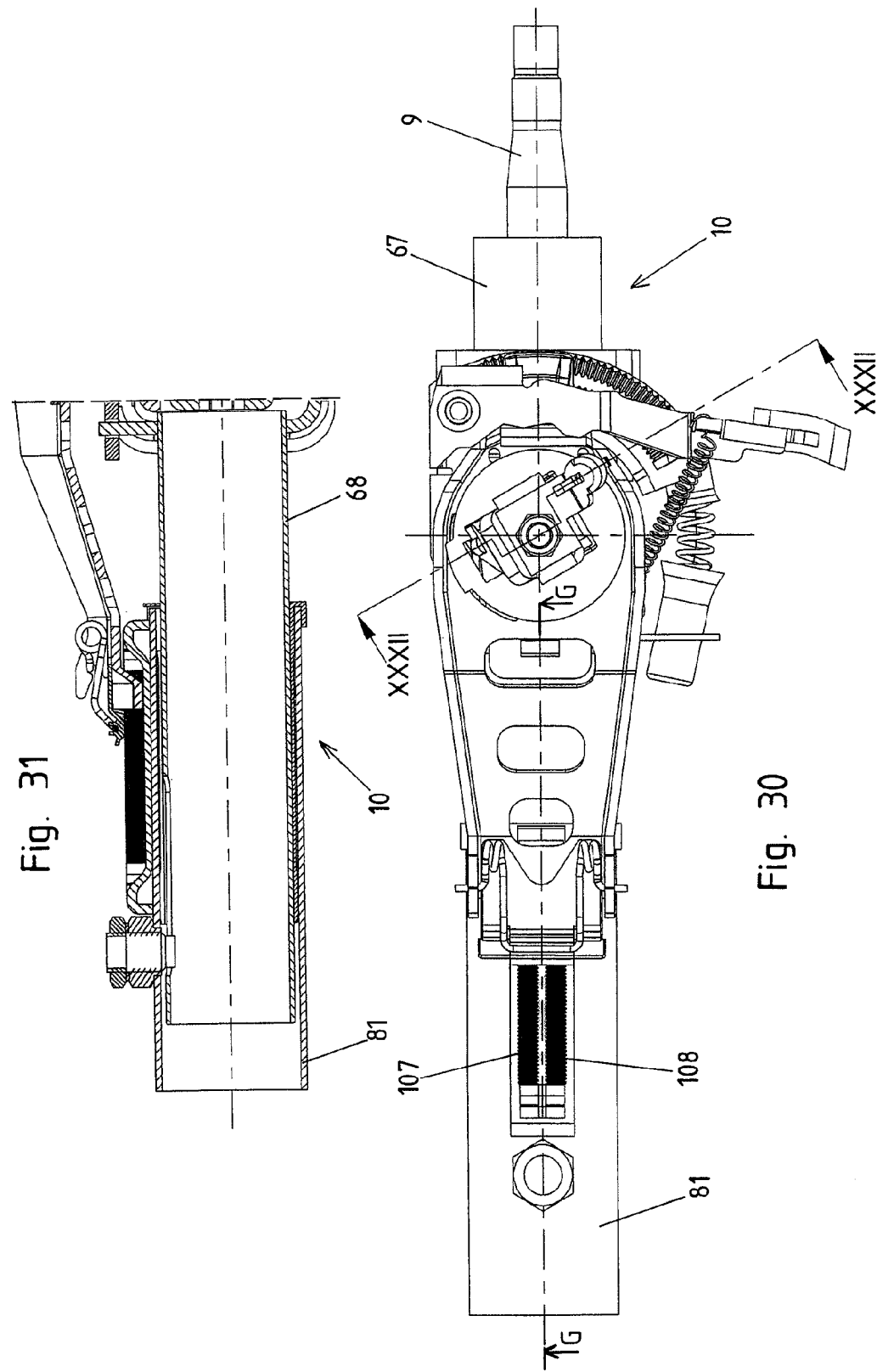

SECUREMENT DEVICE WITH AN AT LEAST HEIGHT-ADJUSTABLE STEERING COLUMN

BACKGROUND OF THE INVENTION a) Field of the Invention

The invention relates to a securement device of an at least height-adjustable steering column, with an openable and closable locking means, which comprises a locking member adjustable via an adjustment path between an open and a closed position, in the open position of which toothings of at least one securement part and at least of one securement counterpart are spaced apart from one another and the height adjustment is enabled and with the adjustment of which from its open position into its closed position the toothings move against the force of at least one spring acting between the securement part and the securement counterpart toward one another in a closure direction and come into engagement with one another.

b) Description of Related Art

Adjustable steering columns are known in different embodiments. In the case of steering columns comprising height adjustment, the height of the steering wheel is adjustable over a certain range, an adjustment of the inclination of the steering column taking place in its section adjoining the steering wheel. Such adjustable steering columns frequently include a length adjustment in addition.

To fix the shell tube housing and supporting the steering spindle in the closed state of the locking means various mechanisms can be employed, for example disk packs acting in the manner of a multiple disk clutch are employed for this purpose. Securement devices are furthermore known which comprise for this purpose securement parts with toothings which can be brought into engagement with one another. The adjustment of the steering column in such securement devices in the open state of the locking means runs extremely smoothly and, in the closed state of the locking means, high holding forces can be applied. Such securement devices with toothed parts engaging one another in the closed state of the securement device are disclosed for example in EP 0 836 981 B1 and EP 0 755 842 B1. To close the locking means a locking member is swivelled, which herein is displaced in the axial direction of a locking bolt, through a connecting link, the link cooperating with the locking member, which has oblique faces, whereupon the locking bolt pulls a securement counterpart having a toothing against a securement part having a toothing. During the opening of the locking member the securement counterpart is raised from the securement part through a spring acting between these two parts, whereby the height adjustment of the steering column is enabled.

Further securement devices, in which for fixing the steering column in the closed state of a locking means toothings of a securement part and of a securement counterpart are brought into engagement with one another, are disclosed inter alia in EP 0 440 403 B1, U.S. Pat. No. 5,787,759 A, EP 0 125 333 B1 and EP 0 139 295 B1. The last two of these documents show so-called "head tilt steering columns" in which the swivel axis for the inclination adjustment of the steering column is located in comparative proximity to the steering wheel. Thereby a relatively large height adjustment range of the steering wheel can be provided. Such head tilt steering columns conventionally comprise a spring, which, with the opening of the locking means, pulls the steering column into its end position in which it is swivelled completely upwardly, whereby the entering and exiting of the driver is facilitated. Problematic is herein that the teeth of the toothings ratchet along one another during the opening of the locking means, in particular if this takes place slowly, through the springs pulling upwardly the part of the steering spindle adjacent to the steering wheel. This leads to an unpleasant noise and to the wear-and-tear of the teeth. This problem may also occur in steering columns without such part of the steering spindle adjacent to the steering wheel or of the spring acting upon the shell tube section supporting the steering spindle, if the height of the steering column is adjusted before the locking means has been completely opened.

With securement devices having toothings the problem may occur that the tips of the teeth of the opposing toothings are directly opposite one another ("tooth-on-tooth position"), when the locking means is to be closed, whereby the securement device cannot be closed correctly but rather first a certain movement of the steering column is required. Various devices have already been proposed by means of which the impacting of the tooth tips when closing the locking means is to be prevented. Such devices are for example described in DE 198 39 496 A1, U.S. Pat. No. 5,787,759 A, DE 39 14 608 C1, EP 0 796 780 A2 and DE 198 46 292.

OBJECT AND SUMMARY OF THE INVENTION

The invention addresses the problem of providing a securement device of the above described type, which exhibits better behavior during opening, wherein in particular a ratcheting along one another of the toothings of the securement part and of the securement counterpart is to be reduced or, as much as possible, excluded.

According to the invention this is attained through a securement device comprising:

- at least one securement part with at least one toothing;
- at least one securement counter post with at least one toothing;
- an openable and closable locking means comprising a locking member adjustable over an adjustment path between an open and a closed position, in whose open position the toothing of the at least one securement part and of the at least one securement counterpart are spaced apart from one another and the height adjustment is enabled and with the adjustment of which from its open position into its closed position the toothings move toward one another into a closure direction against the force of a of at least one spring acting between the securement part and securement counterpart and come into engagement with one another,
- at least one blocking member which assumes a blocking position, in which it blocks the lifting of the securement counterpart from the securement part and keeps the toothings in their engagement, and a release position, in which the securement counterpart can be lifted from the securement part and the toothings can be brought out of engagement,
- wherein a coupling between the locking member and the blocking member exists, by which the blocking member with an adjustment of the locking member, starting from its closed position in the direction of its open position, over a first portion of the adjustment path of the locking member is in the blocking position and, with a further adjustment of the locking member in the direction of its open position, a movement of the blocking member into its release position takes place, the blocking member only assuming the release position if the locking member has already enabled the lifting of the securement counterpart from the securement part through the force of the at least one spring so far that their toothings come to be disengaged.

Consequently, according to the invention, in addition to the locking member, which is adjustable between an open position and a closed position, at least one blocking member is provided which assumes a blocking position, in which it blocks a lifting of the securement counterpart from the securement part and retains the toothing in the engaged state, and a release position, in which the securement counterpart can be lifted from the securement part and the toothings can be made to disengage. The fundamental concept of the invention lies in the cooperation between the locking member and the blocking member. During the opening of the locking member, starting from its closed position, the securement counterpart, without the presence of the blocking member, would gradually (continuously) lift from the securement part until, at a certain position of the locking member, the toothings are finally entirely disengaged. However, up to this position of the locking member, the blocking member blocks the securement counterpart from lifting off the securement part. Only when the locking member already enables the lifting of the securement counterpart from the securement part so far that their toothings can become disengaged, does the blocking member through a coupling with the locking member reach its release position and thereby enables the lifting of the securement counterpart from the securement part. Through the force of the at least one spring, the toothings become raised comparatively quickly so far from one another that they are no longer engaged with one another, whereby clattering or ratcheting of the teeth along one another is at least largely prevented.

The transition of the blocking member between the blocking position and the release position is advantageously abrupt. That means, that with an opening of the locking member, starting from its closed position, the blocking member is initially in its blocking position and specifically up to a preset point of the adjustment path of the locking member. Preferably immediately after passing of this point, the blocking member is in the release position. At least the path of the locking member, via which a change of the state of the blocking member between the blocking position and the release position takes place, is significantly smaller than the entire adjustment path of the locking member, preferably smaller than ⅕ of the entire adjustment path of the locking member, and a value of less than 1/10 is especially preferred.

The coupling between the locking member and the blocking member brings about that the locking member during its opening moves the blocking member from its blocking position into its release position (directly or indirectly via an interspaced transmission member). When closing the locking member, starting from its open position, the blocking member can also be moved into its blocking position through the locking member or for this purpose a spring acting on the blocking member in the direction of its closed position can be provided, as will be explained in further detail in the description of the figures.

In an advantageous embodiment of the invention the locking member is supported for the adjustment between its closed position and its open position and conversely such that it is swivellable over a swivel range. This swivel range or angular range in this case forms the adjustment path of the locking member.

In an advantageous embodiment the blocking member is supported swivellably for the movement between its blocking position and its release position.

A preferred embodiment of the invention provides that the blocking member has a contact face, which, in the blocking position for blocking the lifting of the securement counterpart from the securement part, lies in contact on a contact counterface of the securement counterpart or of a counterpressure part. Through cooperating steps of the stop face and the counterstop face an abrupt transition between the blocking position and the release position of the blocking member results. Instead of steps, it would also be conceivable and possible to provide oblique faces with a sufficiently steep inclination (greater than 45) such that a still sufficiently abrupt transition between the blocked position and the release position always results.

In an advantageous embodiment of the invention for the coupling between the locking member and the blocking member, the locking member comprises an abutment or stop, which, during the adjustment of the locking member, starting from its closed position, in the direction of its open position in the course of the first portion of the adjustment path (preferably in an end region of the same) abuts a counterstop of the blocking member and subsequently entrains the blocking member such that after this first portion of the adjustment path of the locking member it reaches its release position.

Further advantages and details of the invention will be explained in the following in conjunction with the attached drawing. In the drawing depict:

Figure 1:
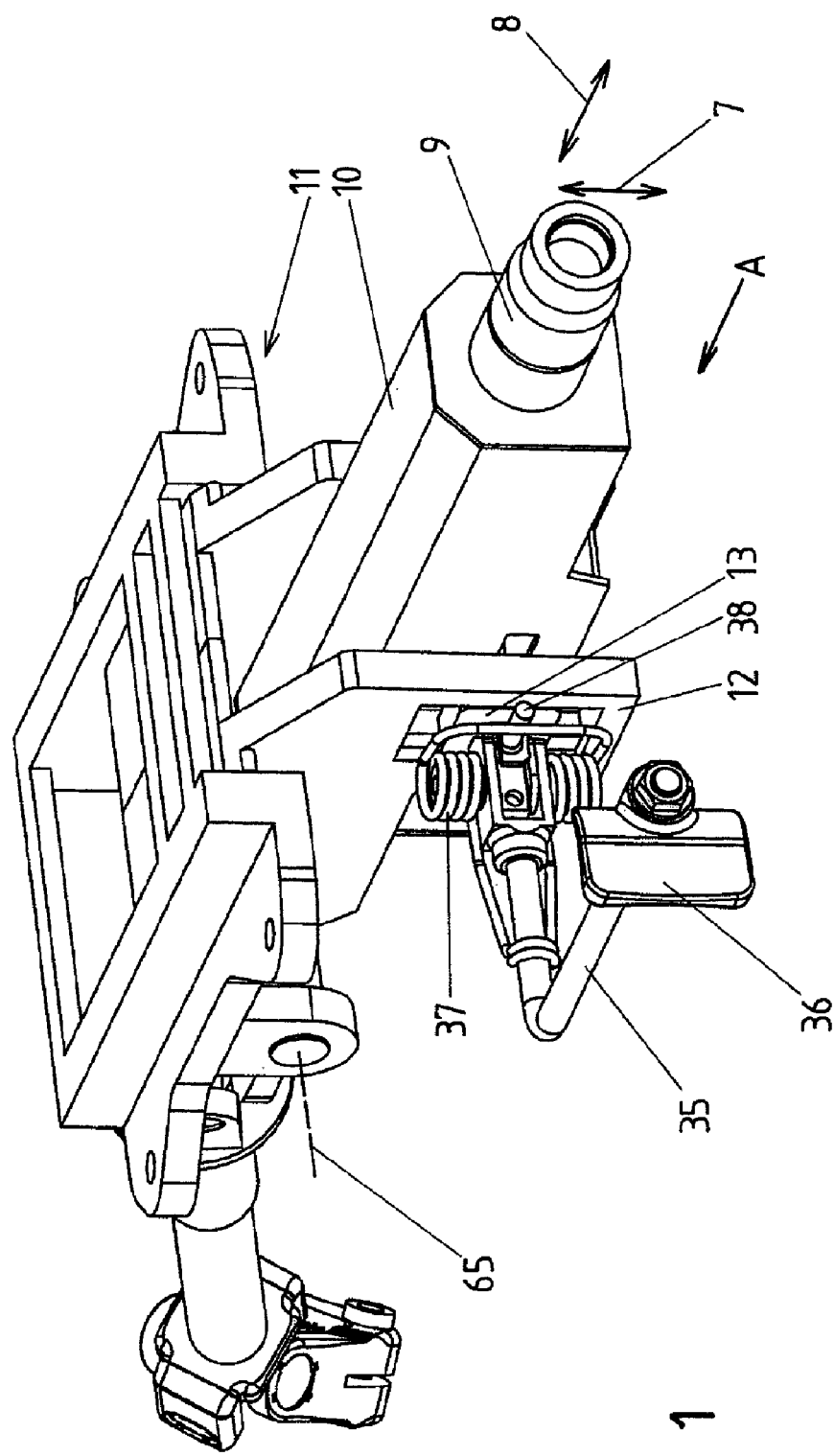
FIG. 1 and FIG. 2 perspective representation from different viewing angles of a steering column with a first embodiment of an inventive securement device, FIGS. 3 and 4 perspective representation analogous to FIGS. 1 and 2, partially in exploded view, FIG. 5 a view, direction of viewing A in FIG. 1, without the shell tube and the steering spindle, FIG. 6 a section along line B-B of FIG. 5, in the closed position of the locking member, FIG. 7 a section corresponding to FIG. 6, however in an intermediate position of the locking member during the opening of the same, FIG. 8 a section corresponding to FIG. 6, however in the open position of the locking member, FIG. 9 a section corresponding to FIG. 6, however in an intermediate position during the closing of the locking member, FIG. 10 a perspective representation of the locking bolt, FIG. 11 a perspective representation of the blocking member, FIG. 12 a perspective representation of sections of the securement part and of the securement counterpart, in the opened state of the securement device, FIG. 13 a side view of the parts of FIG. 12, FIG. 14 a top view onto the securement counterpart, viewing direction C in FIG. 13, FIG. 15 an illustration corresponding to FIG. 12, in the closed state of the securement device, FIG. 16 a side view corresponding to FIG. 13, in the closed state of the securement device, FIG. 17 a section along line D-D of FIG. 16, FIG. 18 a perspective representation of a steering column of the type "head tilt steering column" with a second embodiment of a securement device according to the invention, FIG. 19 a perspective representation of the steering column of FIG. 18 from a different viewing angle (and without steering wheel), FIG. 20 and FIG. 21 perspective representations corresponding to FIG. 18 and FIG. 19, partially in exploded view, FIG. 22 a representation corresponding to FIG. 21, however in further exploded view, FIG. 23 and FIG. 24 a top view and a view from below of the steering column of FIG. 18, FIG. 25 a section along line E-E of FIG. 23, FIG. 26 a partial section along line F-F of FIG. 25, FIGS. 27 to 29 side views of the steering column in the center position (FIG. 27), in the position swivelled up completely (FIG. 28) and in the position swivelled down completely (FIG. 29), FIG. 30 a steering column of the type "head tilt steering column" with a securement device according to a third embodiment of the invention, FIG. 31 a partial section along line G-G of FIG. 30 without the steering spindle housed in the shell tube, FIG. 32 a section along line H-H of FIG. 30, FIG. 33 and FIG. 34 perspective representations of the steering column of FIG. 30, partially in exploded view, FIG. 35 a perspective representation of a portion of the securement device comprising the locking member and the blocking member, in the closed state of the securement device, FIG. 36 a detail I of FIG. 35, FIG. 37 a perspective representation corresponding to FIG. 35, however in the opened state of the securement device, FIG. 38 a detail K of FIG. 37, FIG. 39 a perspective representation of the locking member with a section of the operating lever (open position), FIG. 40 a perspective representation of the press-on lever from below, FIG. 41 and FIG. 42 a view from below and a side view of the securement counterpart.
Figure 2:
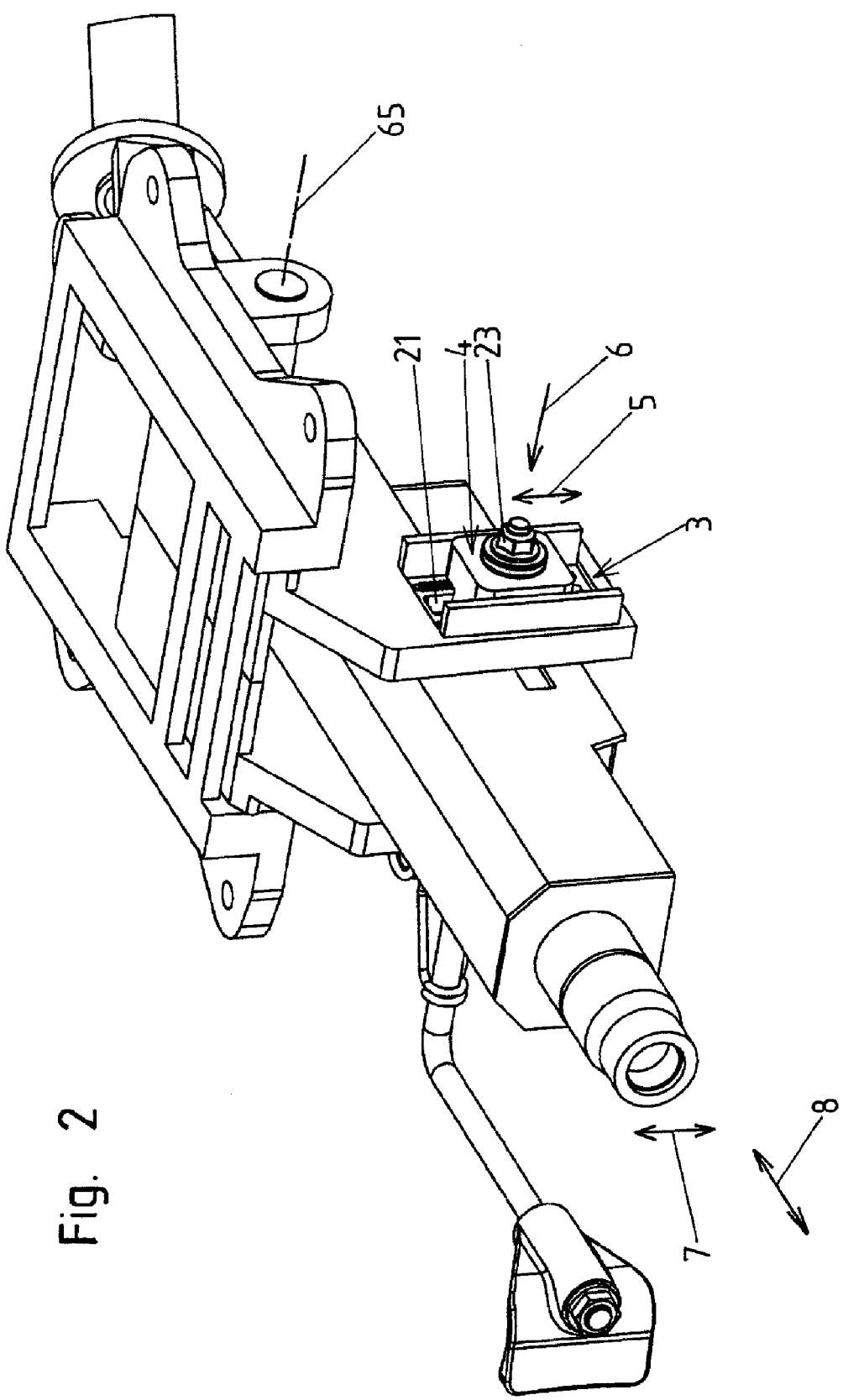
Figure 3:
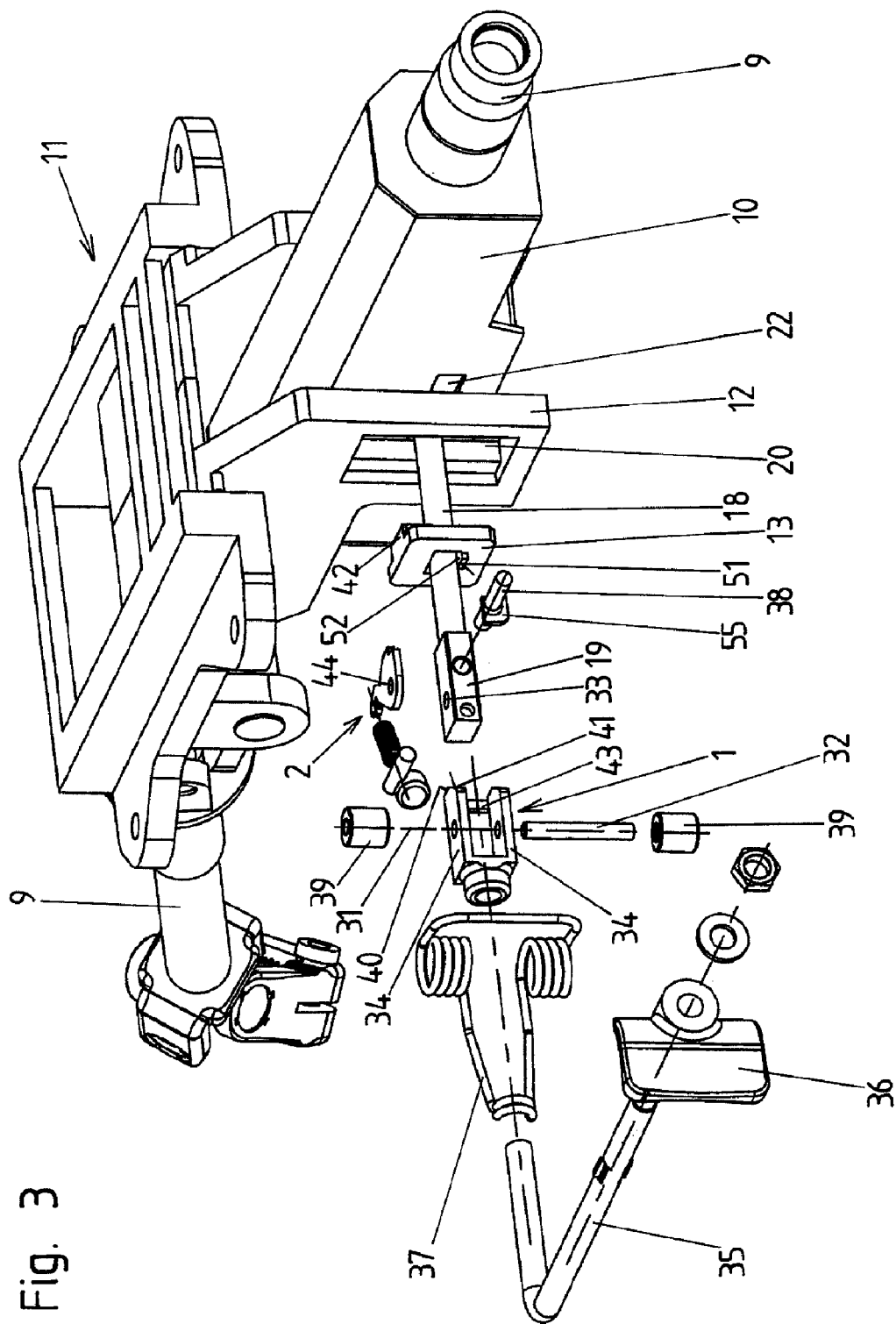
Figure 4:
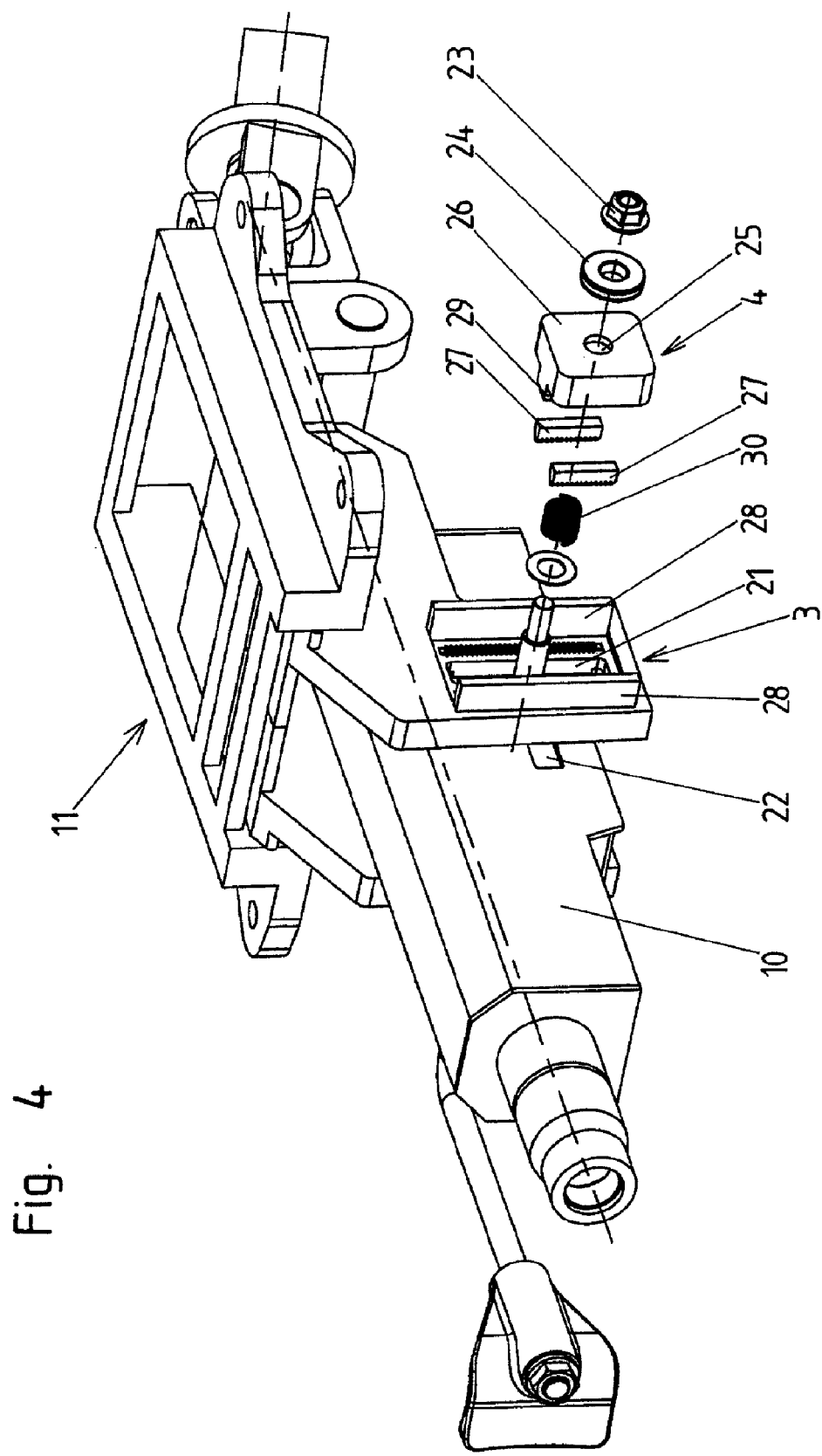
Figure 7:
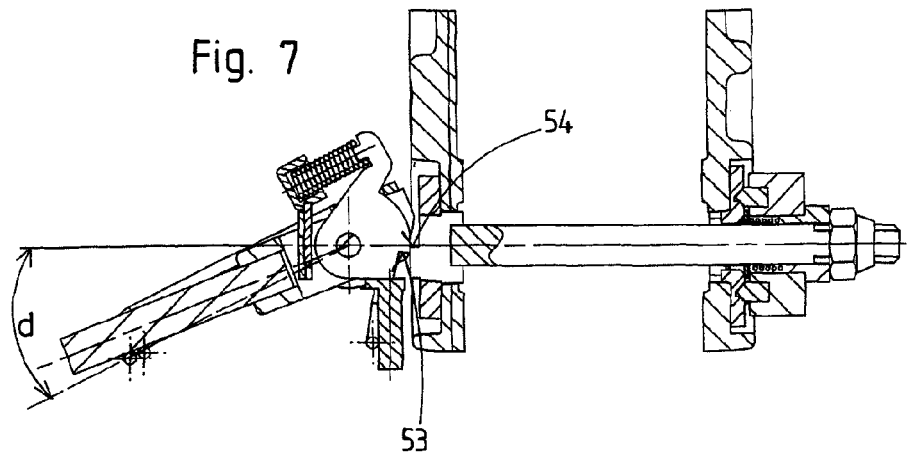

The Figures are drawn to different scales.

DESCRIPTION OF PREFERRED EMBODIMENTS

A first embodiment example of the invention will be explained in the following in conjunction with FIGS. 1 to 17. The depicted steering column is height adjustable (=inclination adjustable) as well as also length adjustable (=adjustable in the axial direction), the directions of the height adjustment and the length adjustment being indicated by the double arrows 7, 8.

The steering column includes a steering spindle 9 comprised of several sections, whose end section adjacent to the steering wheel is rotatably supported in a shell tube 10 and at whose end a steering wheel, not shown in FIGS. 1 to 17, can be attached. The shell tube 10 is supported by a console unit 11, which can be secured in position on the vehicle chassis. The console unit 11 has two side jaws extending on both sides of the shell tube 10 in the downward direction, the one side jaw 12 displaceably supporting a counterpressure part 13 and the other side jaw forming a securement part 3, as will be explained in greater detail below. During the height adjustment of the steering column a swivelling is effected about a swivel axis 65 of the end piece adjacent to the steering wheel, of the steering spindle.

The steering column has a securement device, through which the adjustability of the steering column can be blocked. For this purpose toothings 14-17 of the securement part 3 and of a securement counterpart 4 are brought into engagement with one another. A locking means (locking device) is provided in order to bring the toothings 14-17 through the displacement of the securement counterpart 4 toward the securement part 3 (in the direction of closure 6) into engagement with one another. In the opened state of the locking means the toothings 14-17, in contrast, are out of engagement and the securement counterpart 4 is displaceable with respect to the securement part 3 in a displacement direction 5, the end section adjacent to the steering wheel of the steering spindle 9 being entrained in the direction of the height adjustment 7. The displacement direction 5 points in the direction of a tangent of an imaginary circle extending about the swivel axis 65. In the depicted embodiment the displacement direction 5 lies parallel to the direction of the height adjustment 7.

The securement part 3 is nondisplaceable in the displacement direction 5. In the depicted embodiment example it is also nondisplaceable in the direction of the length adjustment 8.

The locking device comprises a locking bolt 18, which, on the side remote from the securement counterpart 4, has an end piece 19 rectangular in cross section. The locking bolt 18 penetrates the side jaw 12 and the side jaw forming the securement part 3 of the console unit through openings 20, 21, which are formed as elongated holes extending in the direction of the height adjustment and in which the locking bolt 18 is displaceable with respect to the console unit in the direction of the height adjustment 7. The shell tube 10 is penetrated by locking bolt 18 through an elongated hole cutout 22 extending in the direction of length adjustment 8. On the end opposite the end piece 19 a nut 23 is screwed onto outer threads of the locking bolt 18, via which by the locking bolt 18 with the interposition of a flat washer 24 tension can be exerted onto the securement counterpart 4 which the locking bolt penetrates through a bore 25.

The securement counterpart 4 comprises a basic body 26, which in this embodiment has recesses in which two toothed strips 27 are secured in position, each of which is provided with two toothings 16, 17, as will be explained more precisely below. The basic body 26 and the toothed strips 27 can also be formed integrally.

In the securement part 3 on both sides of the opening 21, extending in the direction of the height adjustment 7, guide webs 28 are disposed also extending in the direction of the height adjustment 7, which webs guide with tolerance the basic body 26 in the open position of the locking means in the direction of the height adjustment 7 and secure it with tolerance against twisting. The basic body can additionally, or instead, comprise noses 29 disposed above and below the bore 25 and extending into opening 21. In the securement part 3 on both sides of opening 21 extend two toothings 14, 15 each in the direction of the height adjustment 7, whose formation will be explained in greater detail below. The length of the toothings 14, 15 is greater than that of toothings 16, 17.

A spring 30 exerts a force acting against the closure direction 6 and in terms of a lifting of the securement counterpart 4 from the securement part 3 onto these two parts 3, 4 (in the axial direction of the locking bolt 18).

On the end piece 19 of the locking bolt 18 is supported a locking member 1, and specifically such that it is swivellable about an axis 31 perpendicular to the closure direction 6. For this purpose, a swivel pin 32 is secured in position in a bore 33 in end piece 19, which extends through openings in fork extensions 34 of the locking member 1. With a foot section of the locking member 1, from which extend the fork extensions 34, is connected an operating arm 35 with an operating grip 36. Onto the locking member 1 acts a spring 37 into its open position depicted in FIGS. 1 to 6, the spring 37 being stayed, on the one hand, on the operating arm 35, and on the other hand, on a pin 38 disposed on the end piece 19. Helical sections of the spring 37 encompass rollers 39 located on the swivel pin 32.

The fork extensions 34 have at their end face two press-on faces 40, 41 disposed at an angle with respect to one another, the angle between these two press-on faces preferably being in the range between 120 and 160. Instead of via an edge, the press-on faces 40, 41 can also be connected via an arc and the formation of a single arched press-on face is conceivable and possible. The press-on faces 40, 41 cooperate with the surface of the counterpressure part 13 facing the locking member 1. Through a bore this counterpressure part 13 is penetrated by the locking bolt 18, and this bore has a rectangular cross section and a section of the end piece 19 of locking bolt 18 is located in this bore in order to secure the locking bolt 18 against twisting about its axis. The counterpressure part 13 is supported so as to be displaceable with respect to a side jaw 12 in the direction of the height adjustment 7, and the counterpressure part 13 is secured against twisting about the longitudinal axis of the locking bolt 18 with respect to the side jaw 12. For this purpose, the counterpressure part 13 is received in a cavity in the side jaw 12 whose lateral walls have only a slight tolerance with respect to the side edges of the counterpressure part rectangular in aspect. In addition (or instead), the counterpressure part has for its securement against twisting noses 42 located above and below the opening for the locking bolt 18 and projecting into opening 20.

The locking member 1 also has a web spanning the fork extensions 34 in the proximity of their free ends, which web forms a stop 43.

On the swivel pin 32, a blocking member 2 is supported such that it is swivellable and located between the end piece 19 and the lower fork extension 34 of locking member 1 and has a bore 44 penetrated by swivel pin 32. The blocking member 2 has an extension (cf. for example FIG. 6) on which strikes a spring 46. The spring 46 is stayed, on the other hand, in a spring canister 47 which is fastened by a pin 48 on the end piece 19 (as is evident in particular in FIG. 10). Instead of spring 46, a torsion spring can, for example, also be employed, which acts onto the blocking member 2.

The blocking member 2 is movable between a blocking position, in which it blocks the lifting of the securement counterpart 4 from the securement part 3 and keeps the toothings 14-17 engaged, and a release position, in which the securement counterpart 4 can be lifted from the securement part 3 and the toothings 14, 15 and 16, 17 can be disengaged. The blocking member 2 has a nose 49, which at the end side has a contact face 50. In the blocking position of the blocking member 2, the disengagement of the toothings 14 to 17 is prevented through the contact of the contact face 50 of nose 49 on the contact counterface 51, which is formed by the end face of a nose 52 disposed on the counterpressure part 13. The contact face 50 and the contact counterface 51 end at steps 53, 54. As soon as the blocking member 2 has been swivelled so far that the contact face 50 has been transported via the step 54 of the counterpressure part or the contact counterface 51 via the step 53 of the blocking member (FIG. 8), the blocking member 2 is in its release position.

The opening and closing process of the locking means consequently proceeds in the following manner:

In the closed position of the locking member 1 (FIGS. 1 to 6), the press-on face 40 of the locking member 1 is stayed on the counterpressure part 13, whereby the securement counterpart 4 via the locking bolt 18 against the force of spring 30 is brought with its toothings 16, 17 into engagement with the toothings 14, 15 in the securement part 3 (cf. FIG. 6). The locking member 1 is brought through the action of spring 37 into the closed position. In the closed position of the locking member 1, the contact face 50 of nose 49 of the blocking member 2 has a small distance from the contact counterface 51, which in any case is smaller than the tooth heights of the toothings 14 to 17, preferably smaller than one half the tooth heights.

With an adjustment of the locking member 1, starting from its closed position in the direction of its open position by swivelling operating arm 35, first the contact face 50 of nose 49 comes to rest on the contact counterface 51. Subsequently, the edge between the press-on faces 40, 41 is increasingly raised from the surface of the counterpressure part 13 until the intermediate position evident in FIG. 7 has been reached. At this intermediate position according to FIG. 7, the stop 43 of locking member 1 has just come into contact on the edge of the extension 45 of blocking member 2, which forms a counterstop 115. With the further swivelling of operating arm 35 (i.e. a further adjustment of the locking member 1 in the direction of its open position), the stop 43 entrains the blocking member 2 (tensioning the spring 46). Step 53 of nose 49 is thereby guided in the direction toward step 54 of nose 52 of the counterpressure part 13, and initially the blocking position of blocking member 2 is still present. As long as step 53 of nose 49 has not yet reached step 54 of nose 52, the blocking member 2 is in its blocking position. As soon as step 53 of nose 49 has reached step 54 of nose 52, nose 49 snaps past nose 52 (through the force of spring 30) and the securement counterpart 4 lift off the securement part 3 against the closure direction 6. This occurs if the swivel position depicted in hatched form in FIG. 7 of the operating arm 35 or of the blocking member 2 has been passed. Starting at this position of blocking member 2, the blocking member 2 is in its release position. The adjustment path (which in the present embodiment example represents an angular range) up to this position of the blocking member 2 is denoted by the letter d in FIG. 7.

Figure 8:
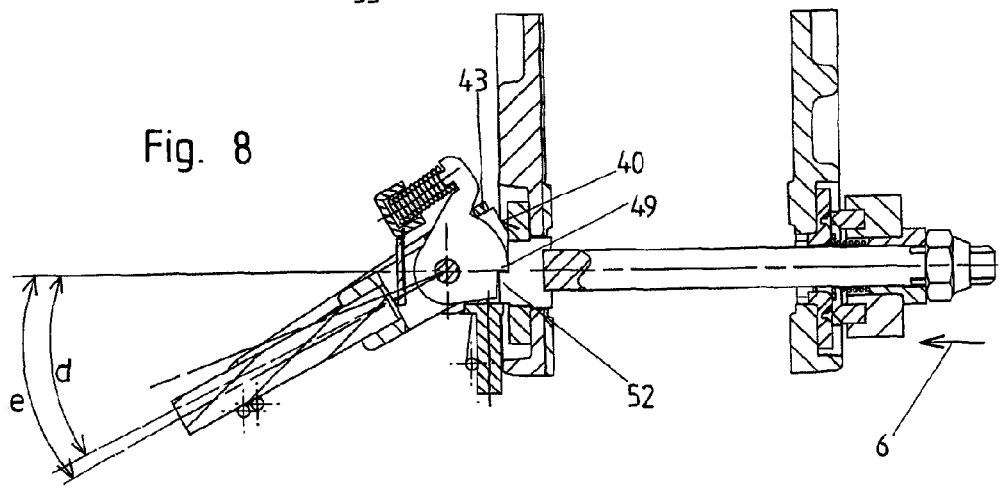

Shortly thereafter, the complete open position of the locking member is reached, which is shown in FIG. 8. At this time, the press-on face 41 abuts the surface of the counterpressure part 13. Swivelling the locking member 1 further is subsequently blocked by a (not shown) stop. The entire adjustment path is denoted in FIG. 8 by the letter e. The difference between the first portion of the adjustment path d and the complete adjustment path e may be, for example, 2°.

In the open position of the locking member 1, the securement counterpart 4 can be displaced with respect to the securement part 3 into the displacement direction 5, during which a height adjustment of the steering column is carried out. A spring may also be provided, which swivels the steering column upwardly in the opened state of the locking means.

Figure 9:
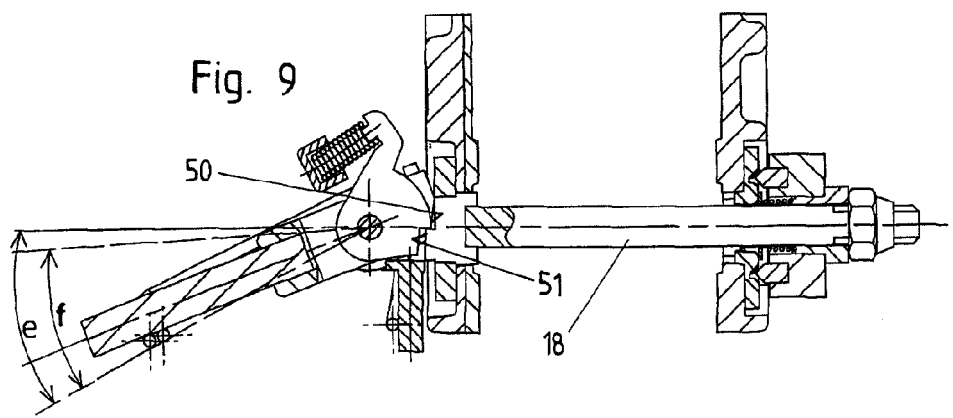
Figure 12:
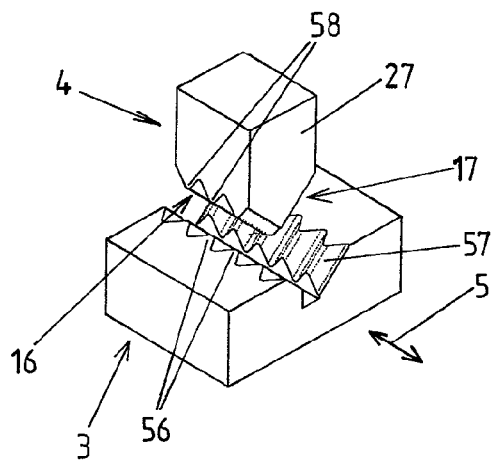
Figure 15:
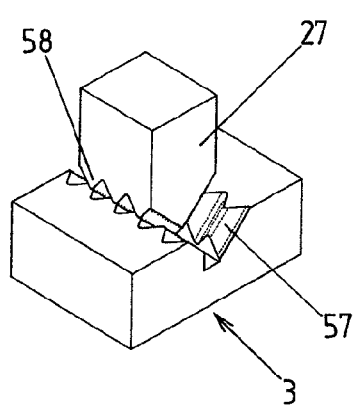
Figure 13:
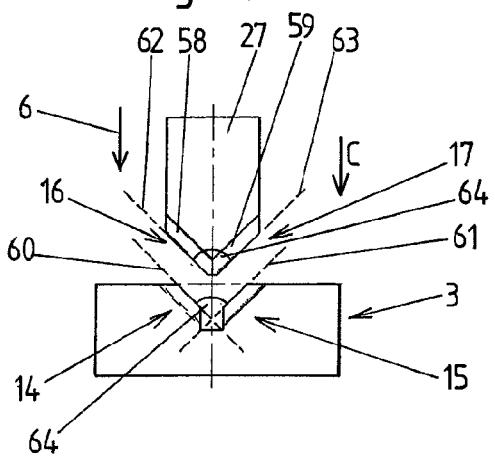
Figure 16:
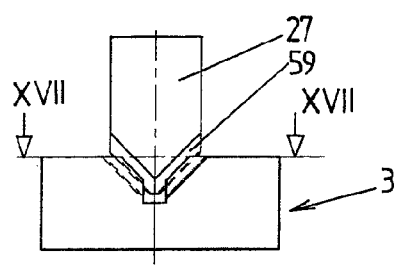
Figure 14:
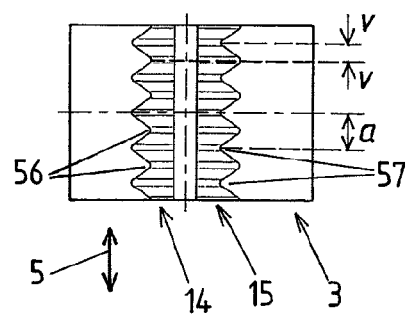

In the resetting of the locking member 1, starting from its open position in the direction of its closed position, the locking member 1 (and with it the blocking member 2), by placing the edge in contact between the press-on faces 40, 41 on the surface of the counterpressure part 13 that is continuously displaced in the closure direction 6, the securement counterpart 4 is continuously displaced by the locking bolt 18 in the closure direction 6. While the stop 43 lifts from the counterstop 115 of the extension 45 of the blocking member 2 as soon as the step 53 comes to rest in contact on step 54, however, initially the blocking member, due to the contact of step 53 on step 54 remains in its release position, and specifically via portion f of the adjustment path (FIG. 9). Only shortly before the locking member 1 reaches its closed position (for example in the range of two to five degrees of angle before the closed position) step 53 is raised over step 54 and the blocking member 2 is moved through the force of spring 46 into its blocking position. The swivelling of the blocking member 2 is here limited by the contact on the small stop plate 55 of pin 38. When the locking member 1 has reached its closed position, the starting position according to FIG. 6 has again been attained. Herein again tolerance between the contact face 50 of nose 49 of blocking member 2 and the contact counterface 51 exists.

In the last portion of the adjustment path before the closed position has been reached, the tensile force exerted by the spring 37 onto the locking bolt 18 via the locking member (acting in the manner of a toggle mechanism) has the highest value.

In order to make possible the problem-free closing of the locking means at every adjustment position of the height adjustment, the implementation of toothings 14-17 can be provided, which will be explained in the following and which is depicted in detail in FIGS. 12 to 17. To prevent a "tooth-on-tooth position" other implementations of the toothings or auxiliary devices are also known, for example disclosed in the prior art listed in the introduction. Such implementations of the toothings are also conceivable and possible.

In the depicted embodiment of the toothings, the two toothed strips 27 of the securement counterpart 4 each has a first and a second toothing 16, 17, which cooperate with first and second toothings 14, 15 of the securement part 3. Each of the toothings 14-17 have a row of teeth 56-59, whose tips extend along straight lines perpendicular to the displacement direction 5. All of the teeth 56-59 have the same distance a from one another. The tips of teeth 58 of the first toothing 16 of the securement counterpart 4 are in a common plane 62, the tips of teeth 59 of the second toothing 17 of securement counterpart 4 are also in a common plane 63. The tips of teeth 56, 57 of toothings 14, 15 of securement part 4 are also each in planes 60, 61.

The planes 62, 63 of toothings 16, 17 of the securement counterpart, like the planes 60, 61 of toothings 14, 15 of the securement part, are disposed in V-shape with respect to one another and form with each other identical angles 64. In the depicted embodiment example, the toothings 16, 17 of securement counterpart 4 form together a type of arrow toothing and the toothings 14, 15 of the securement part an indentation which on cross section has the shape of a V. The plane 62 is parallel to plane 60 and plane 63 is parallel to plane 61.

Figure 17:
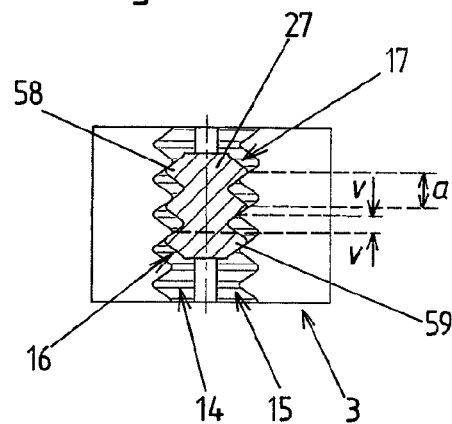
Figure 18:
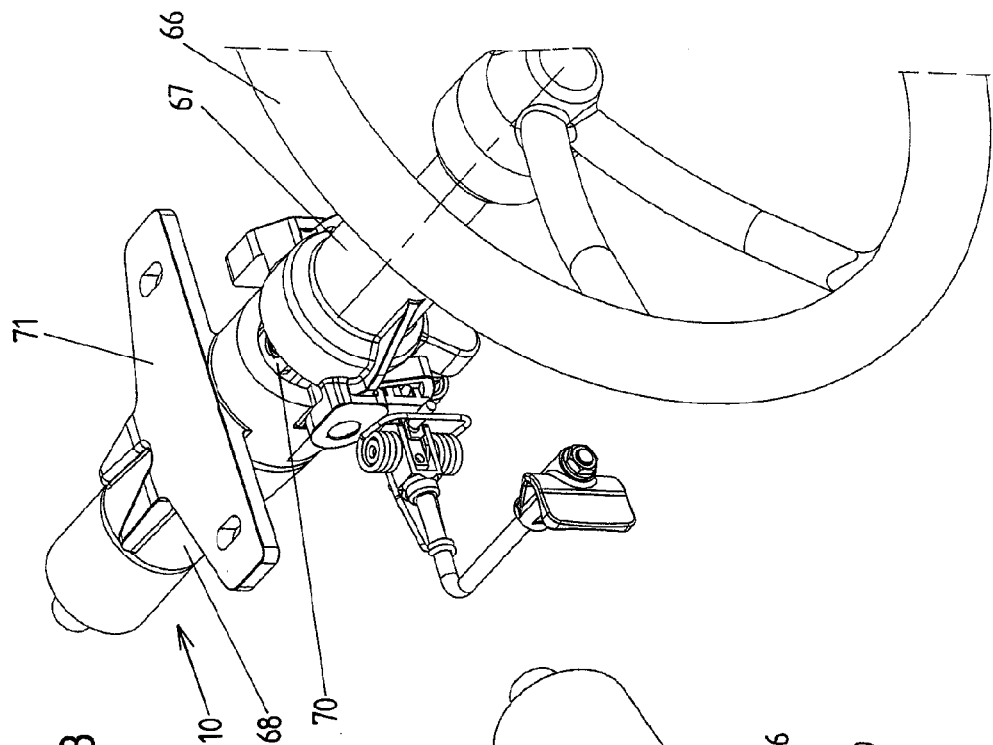
Figure 19:
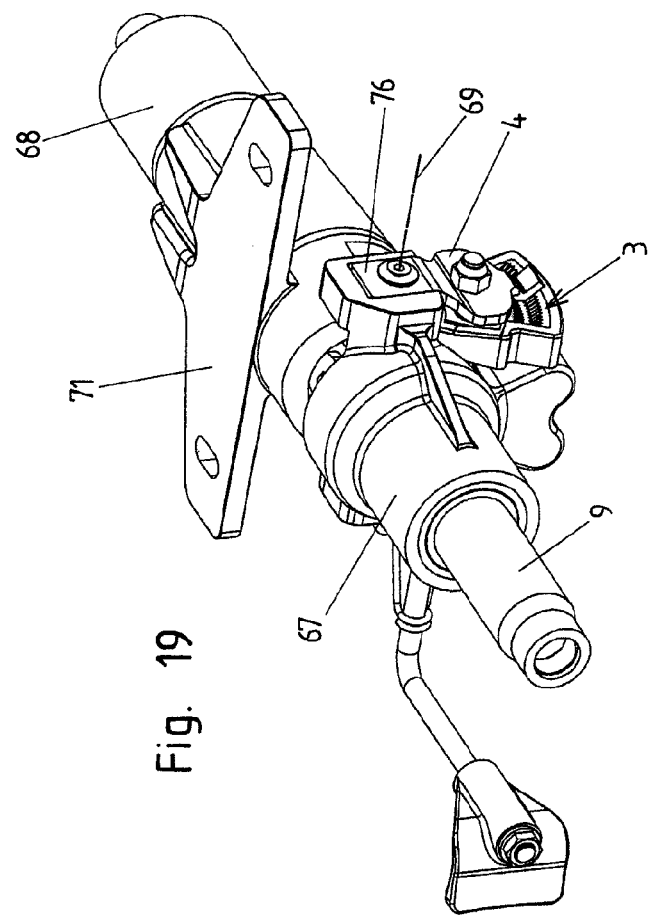
Figure 20:
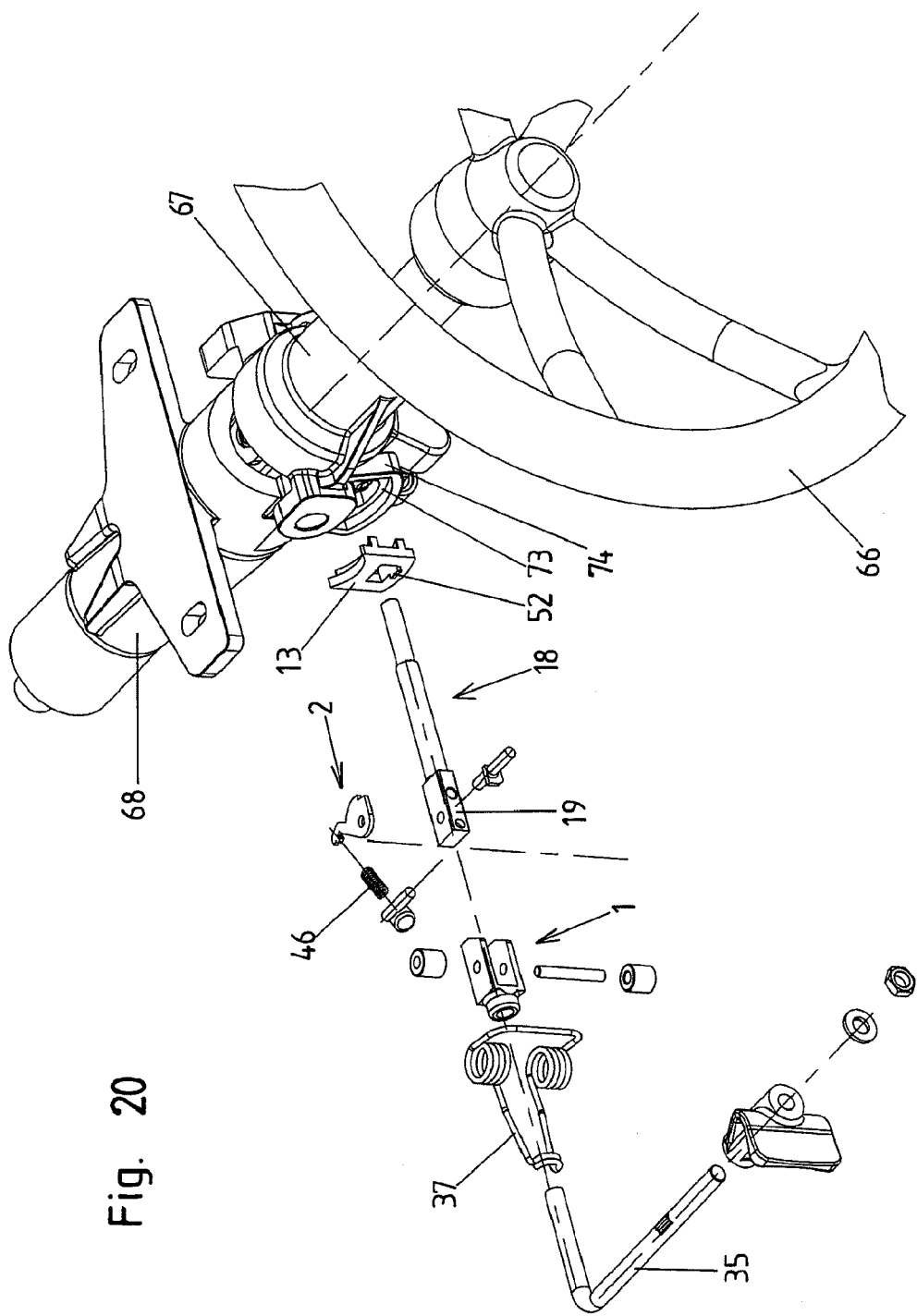
Figure 21:
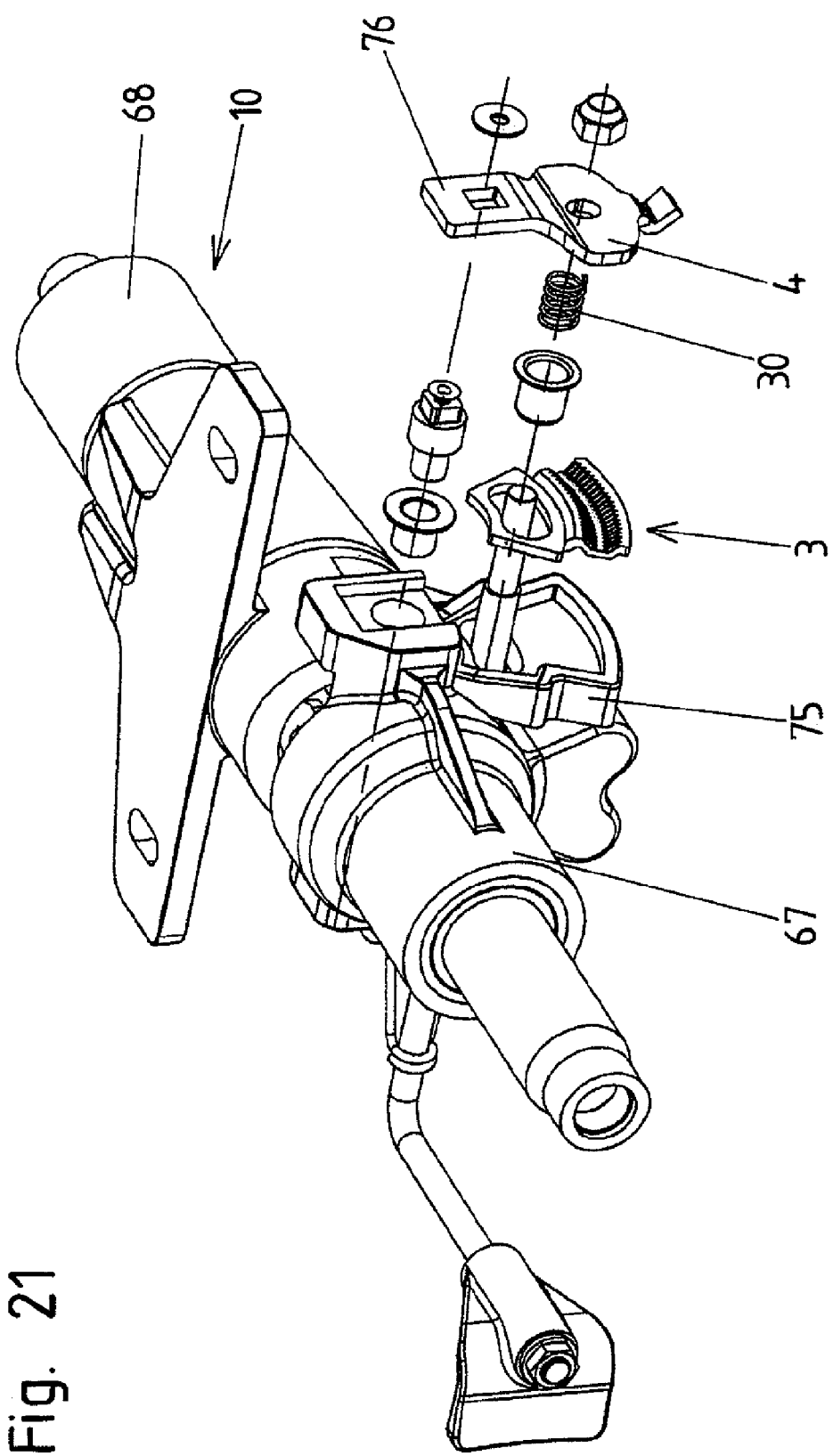
Figure 22:
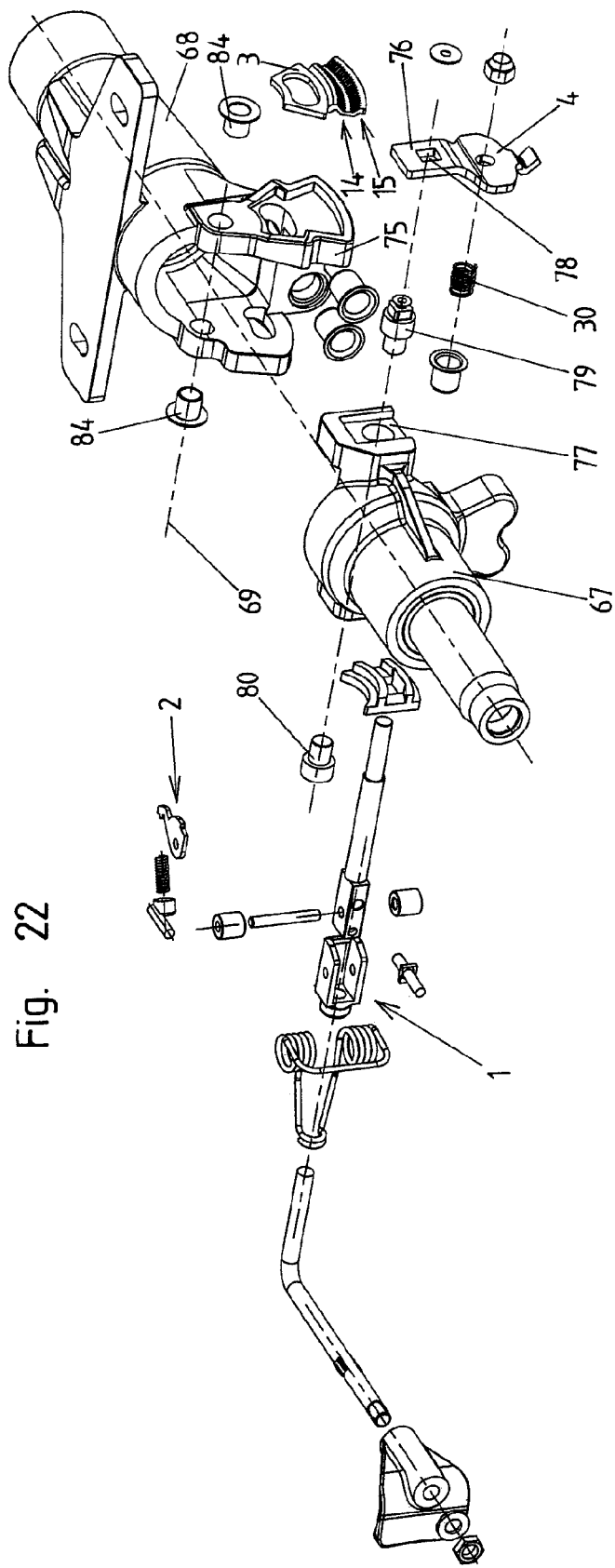
Figure 27:
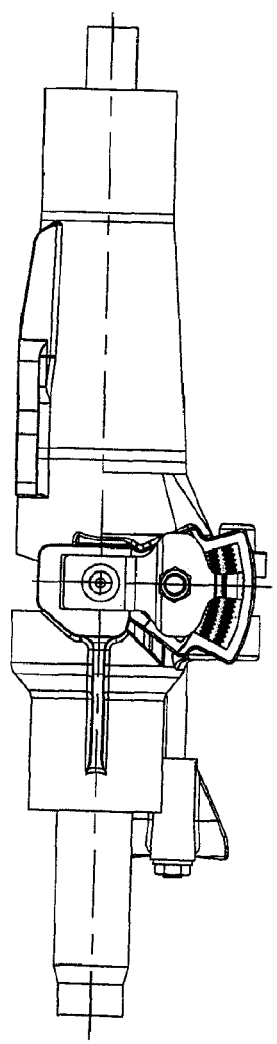
Figure 28:
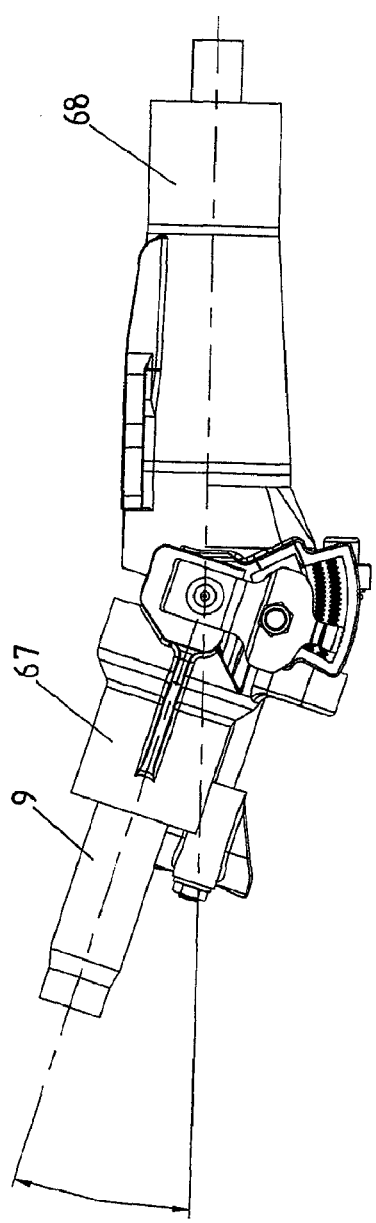
Figure 29:
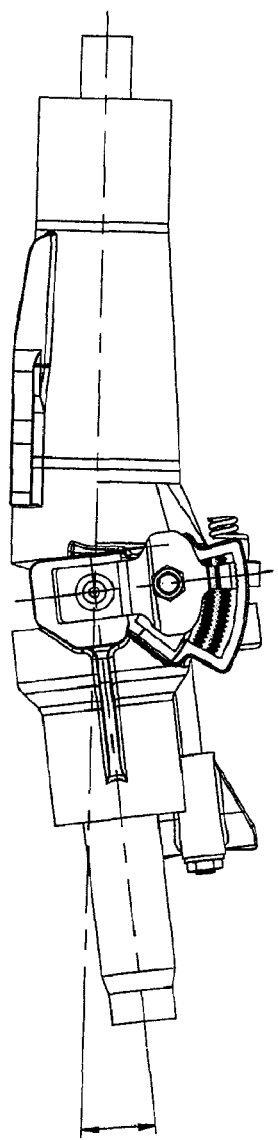

There is no offset between teeth 58, 59 of toothings 16, 17 of securement counterpart 4 in the displacement direction 5, as is evident in the section according to FIG. 17.

This means the tips of teeth 58, 59 are located at the same sites with respect to a line extending parallel to the displacement direction 5, or, expressed differently, for a particular tip of a tooth 58 there exists a straight connection line extending to a tip of tooth 59, which connection line is perpendicular to the displacement direction 5.

In contrast, between teeth 56, 57 of toothings 14, 15 of securement part 3 there is an offset v, i.e. the tips of these teeth 56, 57 are not at the same sites with respect to a line extending parallel to the displacement direction 5. The offset v in this embodiment example is just one half the distance a between two successive teeth 56, 57. It could also be said that the toothings 14, 15 of the securement part are phase-shifted with respect to one another, and specifically in this embodiment example phase-shifted by 90 (corresponding to one half tooth) while teeth 58, 59 of securement counterpart 4 have the same phase position.

As a consequence, the teeth 58, 59 of securement counterpart 4 cannot simultaneously assume a head-to-head position with teeth 56 as well as also with teeth 57 of securement part 3. If the teeth of one of the opposing toothings 14, 16 or 15, 17 assume a head-to-head position, the teeth of the other opposing toothings 14, 16 or 15, 17 have precisely their maximum engagement with one another. In FIG. 17 one of the possible intermediate positions is shown. Depending on the position of teeth 56-59 with respect to one another, a slight displacement of the securement counterpart 4 takes place with respect to the securement part 3 perpendicularly to the displacement direction 5 and perpendicularly to the closure direction 6 (to the left and right in FIG. 17). This displacement of the securement counterpart 4 with respect to the securement part 3 automatically takes place during the closing of the locking means, since between the locking bolt 18 and the securement counterpart 4 and/or between the locking bolt 18 and the securement part 3 there is overall sufficient tolerance.

In this way the step-less adjustment and securement of the steering spindle 9 in the direction of the height adjustment 7 is possible.

Different modifications of toothings 14-17 are conceivable and possible. For example, instead of teeth 56, 57, teeth 58, 59 could also have a phase shift. For example, on each side of the locking bolt 18, instead of two toothings, only one toothing could be provided, the toothings on both sides of the locking bolt being disposed in the shape of a V and the teeth of toothings on both sides of the locking bolt, again, being phase shifted on the securement part and/or in the securement counterpart.

With the nut 23, the position of the securement counterpart 4 can be set with respect to the locking bolt 18 such that in the closed position of the locking member 1 precisely no tolerance between toothings 14-17 is present.

In the closed state of the locking means, furthermore, the side jaw 12 and the side jaw of the console unit 11 forming the securement counterpart 4 are pressed onto the side faces of the shell tube 10 whereby the length adjustment of the steering column is blocked.

In the embodiment example according to FIGS. 18 to 29 the steering column is formed as a head tilt steering column and the shell tube 10 is here formed of several tube pieces, which are denoted as sections 67, 68 and 81 of the shell tube. The shell tube 10 here includes a section 67 adjacent to the steering wheel 66 and a section 68 further removed from the steering wheel 66, the sections 67, 68 being swivellable about the swivel axis 69 with respect to one another and each housing a section of the steering spindle 9, which, in the proximity of the swivel axis 69 are connected with one another through a universal joint 70. The section 68 of shell tube 10 is fastened via a mounting flange 71 on the chassis of the vehicle. Between sections 67, 68 of shell tube 10 beneath the swivel axis 69 springs 72 (cf. FIG. 24) are disposed which, in the opened state of the locking means, swivel the swivellable section 67 of shell tube 10 into its upper end position according to FIG. 28.

The locking means is implemented analogously to the first embodiment example. Locking member 1 with operating arm 35, spring 37, locking bolt 18 and blocking member 2 are herein formed identically. Only the counterpressure part 13 is modified and guided displaceably along a circular arc in a guide indentation 73 in section 68 of the shell tube (and it is again secured against twisting). The opening for the passage of locking bolt 18 and nose 52 are implemented as previously described.

The end of locking bolt 18 opposite end piece 19 pulls again a securement counterpart 4 against the securement part 3 during the closing of the locking member. The securement part 3 is formed by an insert part in the side jaw 75 of section 68 of shell tube 10, which section is stationary on the chassis, and the securement part 3 is rigidly connected with side jaw 75. The locking bolt 18 penetrates the securement part 4, the side jaw 75 and the opposite side jaw 74 of the chassis-stationary section 68 through arcuate cutouts such that during the height adjustment of the steering wheel 66 it is displaceable with respect to these parts.

Locking bolt 18 furthermore penetrates section 67 of the shell tube through a bore (cf. FIG. 25) and during the swivelling of section 67 moves along with it.

The securement counterpart 4 is spaced apart from securement part 3 through spring 30 in the open position of locking member 1. During a height adjustment of the steering spindle securement counterpart 4 in this embodiment example is displaced with respect to securement part 3 along a circular arc whose center is formed by swivel axis 69 and the displacement direction 5 between the securement part 3 and the securement counterpart 4 represents the tangent on this circular arc at each position of the securement counterpart 4 with respect to the securement part 3. The toothings 14-17 of securement part 3 and securement counterpart 4 are here formed in the shape of an arc (the swivel axis 69 forming the center of the circular arc). The toothings 14-17 for the remainder can in principle be implemented analogously to that described in connection with the first embodiment example (cf. in particular the description of FIGS. 12 to 17). The securement part 3 as well as also the securement counterpart 4 comprise each two toothings 14, 15 or 16, 17, respectively, the toothings of the securement counterpart in the depicted embodiment example extending in the shape of a V outwardly and those of the securement part 3 in the shape of a V inwardly and, in the depicted embodiment example, the teeth of toothings 16, 17 are phase shifted with respect to one another (cf. FIG. 26). Since, when bringing the securement counterpart 4 together with the securement part 3, at different adjustment positions, due to the forming of the teeth, a certain displacement of the securement counterpart 4 with respect to the securement part 3 in the direction perpendicular to the displacement direction 5 and to the closure direction 6 takes place (as described), the securement counterpart 4 is connected with the swivellable section 67 of shell tube 10 such that its vertical displacement is limited. For this purpose it has an upwardly extending extension 76, which is guided displaceably in the vertical direction in an indentation 77 of section 67. The extension 76 includes a cutout 78, which is formed as an elongated hole cutout and is penetrated by a retaining part 79, which is pressed into a bore of section 67 and thereby is rigidly connected with section 67. A journal of the retaining part 79 together with a journal 80, pressed from the opposite side into a bore of section 67, forms a swivel bearing for section 67 with respect to section 68, the journal of retaining part 79 and the journal 80 projecting into bores in section 68 (by interconnecting friction bearing bushings 84).

The operational function is analogous to that of the first embodiment example.

Figure 32:
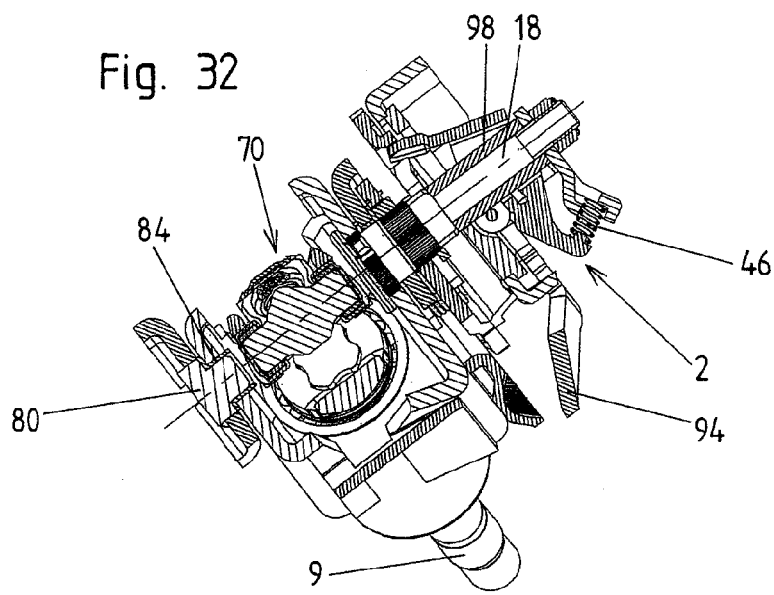
Figure 33:
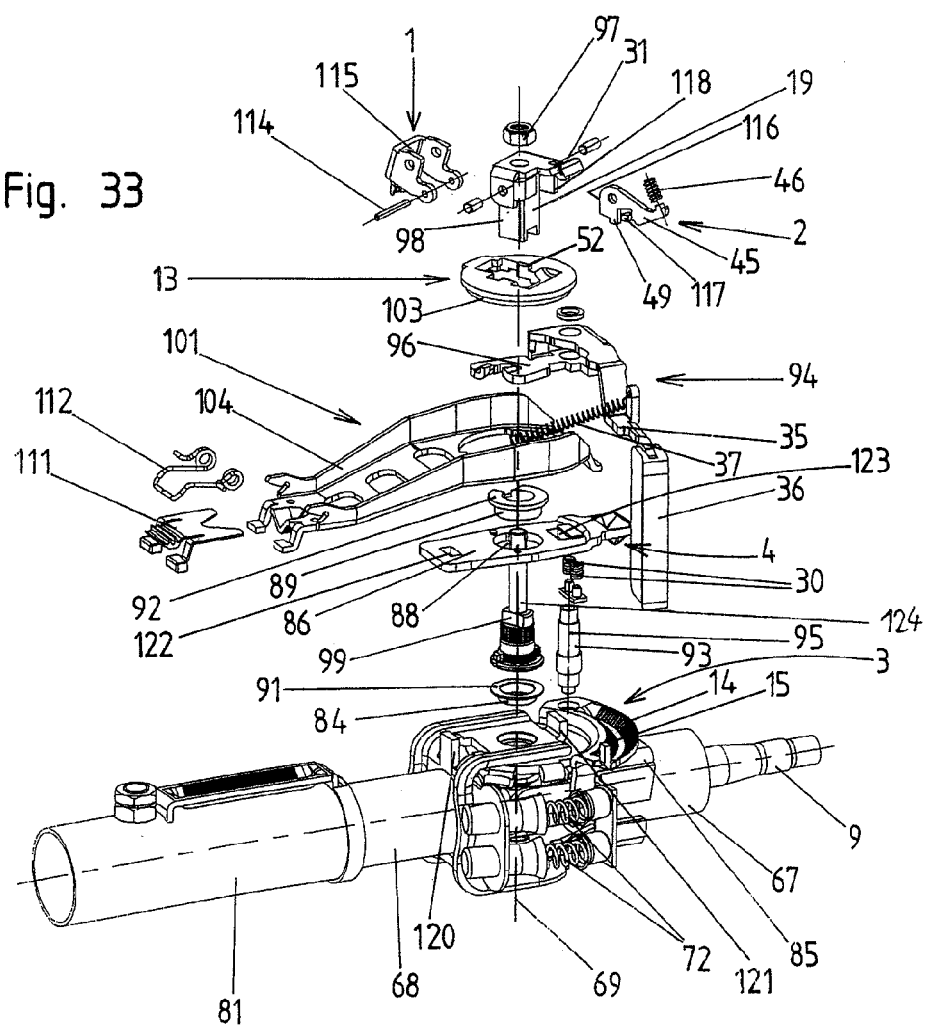
Figure 34:
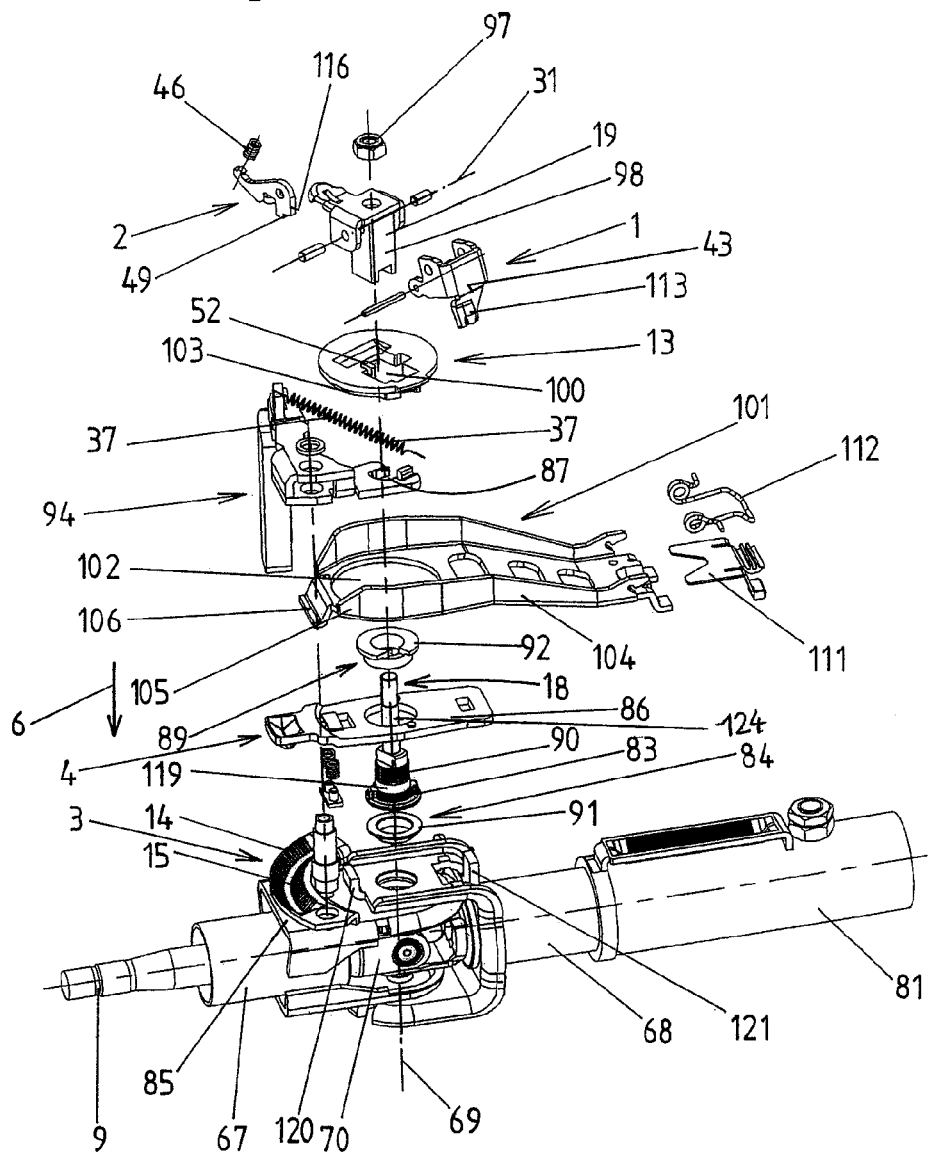
Figure 39:
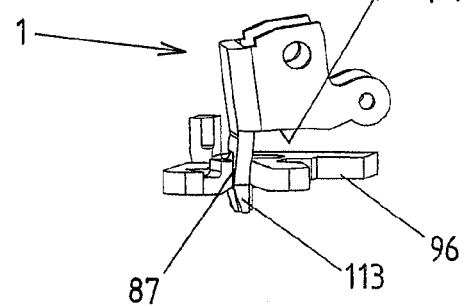

A further embodiment example of the invention is depicted in FIGS. 30 to 42. The steering column is again formed as a "head tilt steering column" with a section 67 of shell tube 10 adjacent to the steering wheel, and section 67 is swivellable with respect to a section 68 further apart from the steering wheel, whereby the height adjustment of the steering wheel is achieved. Section 68 is here supported in a further section 81 such that it is displaceable to a limited extent in the axial direction, whereby a length adjustment of the steering column also becomes possible. The section 81 is mounted with (not shown) mounting parts on the chassis of the vehicle and is consequently stationary on the chassis. For the swivelling of section 67 with respect to section 68 these two sections comprise again swivel forks, which are swivellable about the swivel axis 69 with respect to one another. For this purpose on the one side a journal 80 is provided, which is pressed into a bore in the fork of section 68 and projects into a bore in the fork of section 67, with the interconnection of a friction bearing bushing 84 (cf. FIG. 32). On the other side a knurl 83 of the—in this case axially nondisplaceable—locking bolt 18 is pressed into the fork of the swivellable section 67, and a section 119, adjoining the knurl 83, of the locking bolt projects through a bore in the fork of section 68, and with the interconnection of a friction bearing bushing 84 (FIG. 32, 34).

For the sake of clarity only the section of the steering spindle 9 adjoining the steering wheel is shown.

Securement part 3 is disposed on a side jaw 85 of the swivellable section 67 and includes again toothings 14, 15 with an arcuate course. The securement counterpart 4 comprises an arm extension 86 with guide holes 122, 123, which receive with tolerance noses 120, 121 on the outside of the fork of section 68, whereby the arm extension 86 is secured against swivelling about the swivel axis 69. However, the securement counterpart 4 has a certain tolerance for the setting of its position in the axial direction of section 68. For this purpose the bore 88 in the arm extension 86 is greater than the outer diameter of the bushing 89 penetrating bore 88, which bushing is seated on the knurl 90 of the locking bolt 18. The friction bearing bushing 84 and bushing 89 each has a collar 91, 92 between which lies the arm extension 86 of the securement counterpart 4, and arm extension 86 is displaceable in the axial direction of locking bolt 18 in the region between collars 91, 92. Thereby, the securement counterpart 4 is movable between its position engaged with the toothings 14, 15 of the securement part 3 with its toothings 16, 17 and its position lifted from securement part 3 in the axial direction of the locking bolt 18, which, again, forms the closure direction 6.

Springs 30 disposed between securement part 3 and securement counterpart 4 again cause the spacing of these parts in the opened state of the locking means.

In the swivellable section 67 of shell tube 10 furthermore a journal 93 is secured in position, which projects through bores of an operating lever 94 and supports the operating lever such that it is swivellable about the swivel axis 95. The operating lever, in turn, comprises an operating arm 35 with an operating grip 36. The operating lever 94 comprises furthermore a lever arm 96 which cooperates with the locking member 1.

Locking member 1 is supported swivellably about axis 31 at an end piece 19 of locking bolt 18. Locking bolt 18 is here in this embodiment example not formed integrally but rather comprises a main part 124 and the end piece 19 placed onto the main part 124 and secured by means of a nut 97. To secure the end piece 19 against twisting with respect to the locking bolt serve extensions 98, which are in contact on flattened portions 99 of locking bolt 18. With the nut 97 the entire length of the locking bolt 18 (main part 124 plus end piece 19) can be set such that in the closed position of the locking member 1 just no tolerance between toothings 14-17 and 107-110 (which will be described later) exists.

Swivellably about the axis 31 is furthermore supported the blocking member 2 and it is acted upon in the direction of its blocking position by a spring 46 disposed between its extension 45 and the end piece 19.

The end piece 96 penetrates a cutout 100 in the counterpressure part 13. This, on the one hand, is in contact on a press-on lever 101, which has a circular cutout 102 into which projects a circular extension 103 of the counterpressure part 13 with low tolerance.

The press-on lever 101 has a longer lever arm 104 and a shorter lever arm 105 with a support foot 106, which, in the closed state of the locking means, presses the securement counterpart 4 against the securement part 3. In the proximity of the free end of the press-on lever 101 are disposed toothings 109, 110 (FIG. 40), which cooperate with toothings 107, 108 (FIG. 30) on the chassis-stationary section 81 of the shell tube for the interlocking of the length adjustment of the steering column. The toothings 107-110 extend in the axial direction of section 81 of the shell tube with teeth extending perpendicularly to this axial direction, the teeth of toothings 107 and 108 and 109 and 110, respectively, being disposed in the form of a V with respect to one another. Toothings 107-110 are formed analogously to the toothings 14-17 described in connection with the first embodiment example and their operational function is identical. Thereby, the step-less length adjustment is possible. Other formations of toothings on the lever arm 104 and on section 81 are conceivable and possible.

Onto the end of lever arm 104 is placed a slide shoe 111. A spring 112 serves for spacing the toothings 109, 110 apart from toothings 107, 108 in the opened state of the locking means. The operating lever 94 is acted upon by the spring 37 into the closed position of the locking means. With the swivelling of the operating lever 94 about the swivel axis 95 the locking member 1 is also swivelled. For this purpose an engagement extension 113 of locking member 1 projects into a slot 87 (cf. FIG. 34) in lever arm 96, as is especially evident in FIG. 39. Thereby by means of operating lever 94 the locking member 1 can be swivelled between its closed position and its open position. Pin 114 of locking member 1 limits the further swivelling of the locking member 1 through the force of spring 37, when the locking member 1 is in the closed position.

Figure 35:
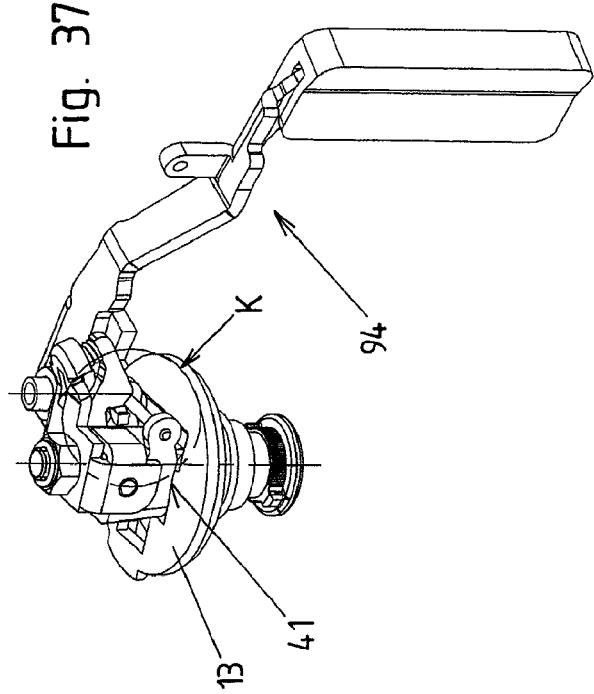
Figure 36:
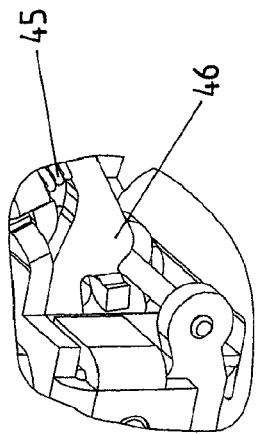

In the closed position, the press-on face 40 of locking member 1 presses against the surface of the counterpressure part 13 facing the locking member 1 (FIG. 35). The counterpressure part 13 thereby presses the press-on lever 101 in the direction toward the shell tube, whereby, on the one hand, the toothings 107-110 have become engaged against the force of spring 112, on the other hand, the support foot 106 of the press-on lever 101 presses the securement counterpart 4 against the securement part 3 such that the toothings 14-17 have become engaged.

The swivelling of the blocking member 2 while it is in its blocking position through the force of spring 46 is limited by the stop web 117 of the blocking member 2, which abuts the edge 118 of the end piece 19.

With the swivelling of locking member 1 in the direction of its open position the press-on face 40 is lifted from counterpressure part 13. However, a displacement of the same through the force of the springs 30, 112 is prevented by the blocking member 2 which is in its blocking position, whose nose 49 is in contact on nose 52 of the counterpressure part 13 (the end-face contact face on nose 49 of the blocking member is in contact on the end-face contact counterface of nose 52 of the counterpressure part).

Figure 37:
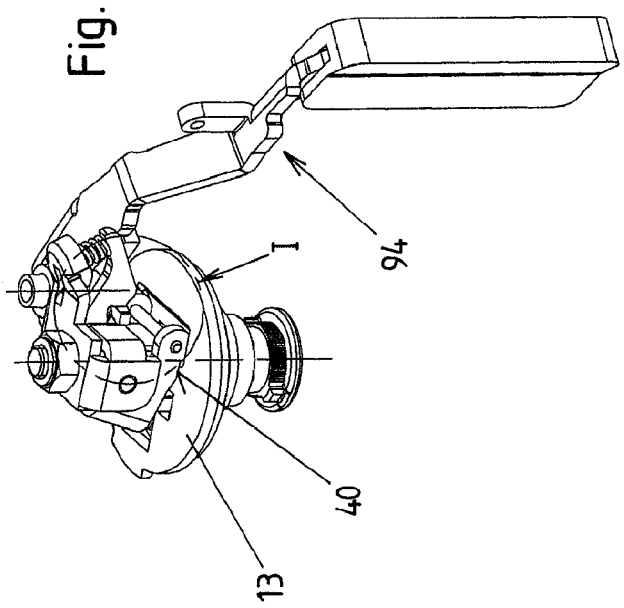
Figure 38:
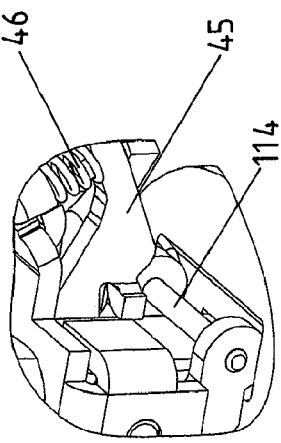
Figure 40:
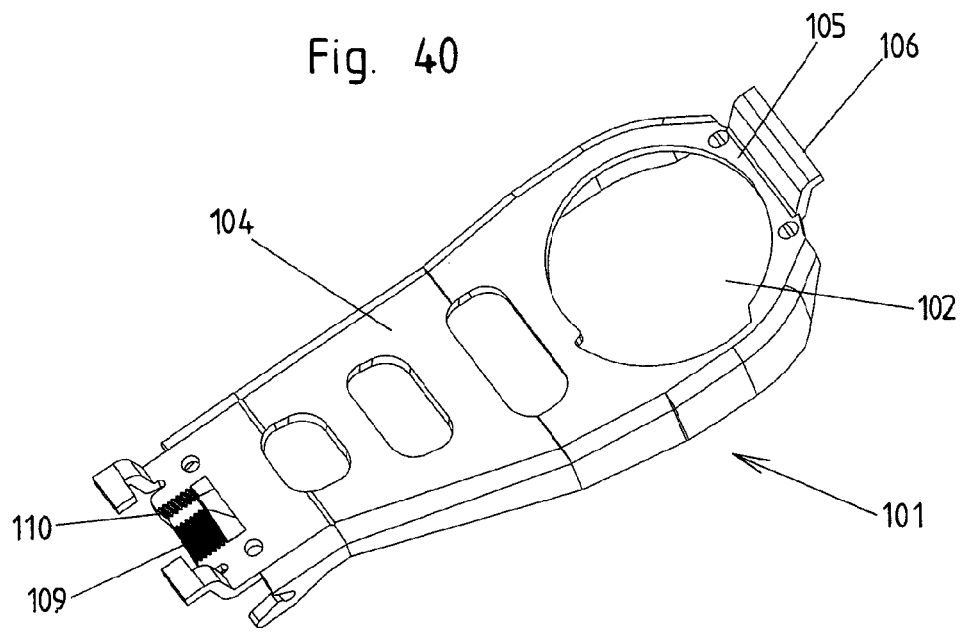
Figure 41:
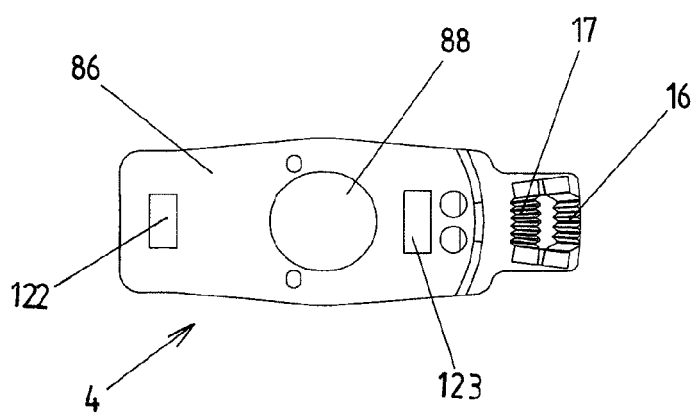
Figure 42:
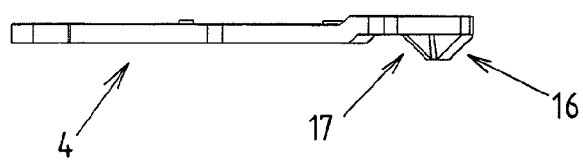

During the swivelling of the locking member 1, the blocking member 2 initially remains in its blocking position. Abutment of the wall forming the stop 43 of locking member 1 on the blocking member 2 (at its edge 116) lastly occurs, whereby with a further swivelling of locking member 1, the blocking member 2 is swivelled until the edge of nose 49 has reached the edge of nose 52, whereupon the release position of blocking member 2 is reached. Subsequently the counterpressure part 13 can become displaced in the direction facing away from the shell tube 10 (counter to the closure direction 6), until it is in contact on the press-on face 41 of the locking member 1 (FIG. 37). With the counterpressure part 13 a displacement of the press-on lever 101 and of the securement counterpart 4 also occurs. Toothings 14-17 of the height adjustment and 107-110 of the length adjustment therein become disengaged through the force of springs 30, 112.

In the opened state of the locking means the section 67 of the shell tube 10 is swivelled upwardly through the springs 72. With the swivelling of section 67 the locking bolt 18 is also swivelled and with it the end piece 19 with the locking member 1, supported on it, and blocking member 2 as well as the counterpressure part 13.

Different modifications of the described embodiment examples are conceivable and possible. For example, instead of a swivellable support of the blocking member, a displaceable support of it would also be possible. It would in principle also be conceivable and possible to support the locking member also not swivellably but rather displaceably, and the press-on face cooperating with a correspondingly formed counterpressure part could have a wedge-form course. The locking member could herein be directly actuatable or through an operating lever cooperating with the locking member.

The locking means could also comprise an arm member rotatable about the axis of the locking bolt by means of an operating arm. The blocking member in this case would also be swivellable about the axis of the locking bolt for the movement between its blocking position and its release position. In the blocking position it would herein block a lifting of the securement counterpart from the securement part (for example through the contact of a nose on a counterpressure part). Again, a coupling between the locking member and the blocking member would need to be provided through which, with an adjustment of the locking member from its closed position into its open position, the blocking member is entrained into its release position after a portion of the adjustment path of the locking member (and conversely during the closing process of the securement device).

LEGEND TO THE REFERENCE NUMBERS

1 Locking member
2 Blocking member
3 Securement part
4 Securement counterpart
5 Displacement direction
6 Closure direction
7 Direction of height adjustment
8 Direction of length adjustment
9 Steering spindle
10 Shell tube
11 Console unit
12 Side jaw
13 Counterpressure part
14 Toothing
15 Toothing
16 Toothing
17 Toothing
18 Locking bolt
19 End piece
20 Opening
21 Opening
22 Elongated hole cutout
23 Nut
24 Flat washer
25 Bore
26 Basic body
27 Toothed strip
28 Guide web
29 Nose
30 Spring
31 Axis
32 Journal
33 Bore 34 Fork extension
35 Operating arm
36 Operating grip
37 Spring
38 Pin
39 Roller
40 Press-on face
41 Press-on face
42 Nose
43 Stop
44 Bore
45 Extension
46 Spring
47 Spring canister
48 Pin
49 Nose of blocking member
50 Contact face
51 Contact counterface
52 Nose of counterpressure part
53 Step
54 Step
55 Small stop plate
56 Tooth
57 Tooth
58 Tooth
59 Tooth
60 Plane
61 Plane
62 Plane
63 Plane
64 Angle
65 Swivel axis
66 Steering wheel
67 Swivellable section
68 Section
69 Swivel axis
70 Universal joint
71 Mounting flange
72 Spring
73 Guide indentation
74 Side jaw
75 Side jaw
76 Extension
77 Indentation
78 Cutout
79 Retaining part
80 Journal
81 Section
82 Friction bearing part
83 Knurl
84 Friction bearing bushing
85 Side jaw
86 Arm extension
87 Slot
88 Bore
89 Bushing
90 Knurl
91 Collar
92 Collar
93 Journal
94 Operating lever
95 Swivel axis
96 Lever arm
97 Nut
98 Extension
99 Flattened portion
100 Cutout
101 Press-on lever
102 Cutout
103 Extension
104 Lever arm
105 Lever arm
106 Support foot
107 Toothing
108 Toothing
109 Toothing
110 Toothing
111 Slide shoe
112 Spring
113 Engagement extension
114 Pin
115 counterstop
116 Edge
117 Stop web
118 Edge
119 Section
120 Nose
121 Nose
122 Guide hole
123 Guide hole
124 Main part

The invention claimed is:

1. A securement device of a height adjustable steering column, comprising:
a securement part with a toothing;
a securement counterpart with a toothing;
a counterpressure part for pressing said securement part and said securement counterpart together;
an openable and closable locking device comprising a locking member adjustable over an adjustment path between an open position and a closed position, said locking member being configured to apply a pressure against said counterpressure part when in the closed position such that said counterpressure part presses said securement part and said securement counterpart together such that said toothing of said securement part engages with said toothing of said securement counterpart, and said locking member being configured to release the pressure applied against said counterpressure part when in the open position, so as to allow said securement part to move apart from said securement counterpart such that said toothing of said securement part and said toothing of said securement counterpart are spaced apart from one another to allow for a height adjustment of the steering column, said securement part being configured such that, during adjustment of said securement part from the open position into the closed position, said toothing of said securement part and said toothing of said securement counterpart are moved by said counterpressure part toward one another in a closing direction against a force of a spring acting between said securement part and said securement counterpart and come into engagement with one another; and
a blocking member operable to assume a blocking position in which said blocking member prevents movement of said counterpressure part so as to thereby prevent separation of said securement counterpart from said securement part and so as to thereby keep said toothing of said securement part engaged with said toothing of said securement counterpart, and said blocking member being operable to assume a release position in which said blocking member allows said counterpressure part to be moved so as to allow said securement counterpart to be separated from said securement part and said toothing of said securement part to be disengaged from said toothing of said securement counterpart;

wherein said locking member is coupled to said blocking member so that, with an adjustment of said locking member starting from the closed position in the direction of the open position over a first portion of the adjustment path of said locking member, said blocking member is initially in the blocking position, and with a further adjustment of said locking member in the direction of the open position over a second portion of the adjustment path of said locking member, said blocking member is subsequently moved into the release position, wherein said locking member and said blocking member are configured such that said blocking member only assumes the release position after said locking member has already assumed a position in which said locking member releases the pressure applied against said counterpressure part so as to allow said securement counterpart to be separated from said securement part through the force of said spring such that said toothing of said securement part and said toothing of said securement counterpart can become disengaged.

2. The securement device as claimed in claim 1, wherein the first portion of the adjustment path, starting from the closed position in the direction of the open position, accounts for the largest portion of the entire adjustment path between the closed position and the open position.

3. The securement device as claimed in claims 1, wherein said locking member and said blocking member are configured such that, during an adjustment of said locking member starting from the open position in the direction of the closed position, over the first portion of the adjustment path of said locking member in the closing direction, said blocking member is in the release position and only with a further adjustment of said locking member in the closed position does said blocking member move into the blocking position.

4. The securement device as claimed in claim 3, wherein the first portion of the adjustment path in the closing direction accounts for the largest portion of the entire adjustment path.

5. The securement device as claimed in claim 1, further comprising a blocking-member spring for acting upon said blocking member in the direction of the blocking position.

6. The securement device as claimed in claim 1, wherein said locking member is supported so as to be swivellable about an axis over a swivel range forming the adjustment path.

7. The securement device as claimed in claim 6, wherein the axis is perpendicular to the closing direction.

8. The securement device as claimed in claim 1, wherein said blocking member is swivellably supported for movement between the blocking position and the release position.

9. The securement device as claimed in claim 8, wherein said blocking member is supported so as to be swivellable about a same axis as said locking member.

10. The securement device as claimed in claim 1, wherein said blocking member has a contact face configured such that, in the blocking position for preventing the lifting of said securement counterpart from said securement part, said contact face contacts a contact counterface of said securement counterpart or a contact counterface of said counterpressure part.

11. The securement device as claimed in claim 10, wherein said contact face and said contact counterface each ends at a step arranged so that, with movement of said blocking member into the release position, a crossover of said step of said contact face over said step of said contact counterface occurs.

12. The securement device as claimed in claim 10, wherein said contact face is located on an end face of a nose of said blocking member.

13. The securement device as claimed in claim 10, wherein said contact counterface is located on an end face of a nose of said securement counterpart or said counterpressure part.

14. The securement device as claimed in claim 1, further comprising a stop configured so that, with the adjustment of said locking member from the closed position in the direction of the open position during the first portion of the adjustment path, said stop abuts a counterstop of said blocking member and subsequently entrains said blocking member.

15. The securement device as claimed in claim 1, further comprising an operating arm for allowing swivelling of said locking member between the closed position and the open position, said operating arm being disposed on or connected with said locking member.

16. The securement device as claimed in claim 15, wherein said operating arm is arranged to be acted upon by an arm spring into a swivel position in which said locking member is in the closed position.

17. The securement device as claimed in claim 16, wherein said counterpressure part is supported on a side jaw in the displacement direction between said securement part and said securement counterpart such that said counterpressure part is displaceable, a locking bolt being configured to penetrate an opening in said side jaw and to be displaceable in the displacement direction with respect to the side jaw in the opening, said side jaw being nondisplaceable in the closing direction.

18. The securement device as claimed in claim 17, wherein said securement part is formed by an opposing side jaw which is nondisplaceable in the closing direction, said opposing side jaw also has an opening penetrated therethrough by said locking bolt, wherein said locking bolt is displaceable in the displacement direction between said securement part and said securement counterpart with respect to said side jaw.

19. The securement device as claimed in claim 1, wherein said locking member is supported on a locking bolt such that said locking member is swivellable.

20. The securement device as claimed in claim 19, wherein said locking bolt is configured to be displaceable in the closing direction of said securement counterpart and to strike upon said securement counterpart for the displacement of said securement counterpart in the direction toward said securement part, said locking member in the closed position being in contact with a press-on face of a counterpressure part which is nondisplaceable in the closing direction.

21. The securement device as claimed in claim 19, wherein said locking bolt is supported nondisplaceably in the closing direction, said locking member has a press-on face in contact with a counterpressure part when in the closed position, said counterpressure part being displaceable in the closing direction, wherein said counterpressure part is configured to press said securement counterpart against said securement part directly or indirectly.

22. The securement device as claimed in claim 21, wherein said securement counterpart has a bore penetrated by said locking bolt, and said securement counterpart is supported displaceably on said locking bolt in the closing direction.

23. The securement device as claimed in claim 22, further comprising a press-on lever supported on said locking bolt displaceably in the closing direction, wherein toothings on said press-on lever and on a chassis-stationary section of a shell tube supporting a steering spindle in the closed position of said locking member are engaged with one another and the toothings in the open position of said locking member are spaced apart from one another, wherein a length adjustment of said steering column is enabled.

24. The securement device as claimed in claim 19, wherein said blocking member is supported on said locking bolt so as to be swivellable.

25. The securement device as claimed in claim 24, wherein said blocking member cooperates with said counterpressure part, and said locking member cooperates with said counterpressure part.

26. The securement device as claimed in claim 1, further comprising a shell tube supporting a steering spindle, said shell tube including a first section adjacent to a steering wheel, said first section being swivellable for the height adjustment of the steering column with respect to a second section further removed from the steering wheel.

27. The securement device as claimed in claim 26, wherein said second section is supported in a third section removed further from the steering wheel than said second section, said third section being displaceable in a longitudinal direction of said third section.

28. The securement device as claimed in claim 1, wherein teeth of said toothings extend perpendicular to a displacement direction between said securement part and said securement counterpart, and successive teeth of said toothings are each spaced the same distances one from the other, tips of said teeth of said toothings are each located in one plane, planes of said toothings and planes of said teeth of said toothings are arranged in a V-shape with respect to one another and form identical angles, wherein between said teeth of said toothings of said securement part or between said teeth of said toothings of said securement counterpart an offset is present in the displacement direction, said offset amounting to a portion of a distance between successive teeth.

29. The securement device as claimed in claim 28, wherein said offset amounts to one half of the distance between successive teeth.

* * * * *